(12) United States Patent
Geng et al.

(10) Patent No.: US 11,369,000 B2
(45) Date of Patent: Jun. 21, 2022

(54) COMMUNICATION METHOD AND COMMUNICATIONS APPARATUS

(71) Applicant: Huawei Technologies Co., Ltd., Shenzhen (CN)

(72) Inventors: Tingting Geng, Shanghai (CN); Hongping Zhang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 29 days.

(21) Appl. No.: 16/991,824

(22) Filed: Aug. 12, 2020

(65) Prior Publication Data

US 2020/0374972 A1 Nov. 26, 2020

Related U.S. Application Data

(63) Continuation of application No. PCT/CN2019/074757, filed on Feb. 11, 2019.

(30) Foreign Application Priority Data

Feb. 13, 2018 (CN) .......................... 201810150970.8

(51) Int. Cl.
*H04W 76/30* (2018.01)
*H04W 76/27* (2018.01)
(Continued)

(52) U.S. Cl.
CPC .......... *H04W 76/30* (2018.02); *H04W 28/06* (2013.01); *H04W 52/0212* (2013.01); *H04W 76/27* (2018.02); *H04W 92/20* (2013.01)

(58) Field of Classification Search
CPC . H04W 52/00; H04W 52/02; H04W 52/0209; H04W 52/0212; H04W 76/00;
(Continued)

(56) References Cited

U.S. PATENT DOCUMENTS 10,812,973 B2 * 10/2020 Tenny ..................... H04W 4/50
2017/0245318 A1 8/2017 Rayavarapu et al.
(Continued)

FOREIGN PATENT DOCUMENTS

CN 102665245 A 9/2012
CN 103858513 A 6/2014
(Continued)

OTHER PUBLICATIONS

Catt, "RAN-based notification area update procedure", 3GPP TSG-RAN WG2 #100 R2-1712423, Nov. 27-Dec. 1, 2017, 3 pages, Reno, USA.
(Continued)

*Primary Examiner* — Robert C Scheibel
(74) *Attorney, Agent, or Firm* — Slater Matsil, LLP

(57) ABSTRACT

Embodiments of this application provide a communication method and a communications system. The method includes: receiving, by a second network device from a first network device, information used to indicate that a terminal initiates a radio access network notification area update (RNAU), generating, by the second network device based on the information, a radio resource control release message on which security protection has been performed, and sending, to the first network device, the radio resource control release message on which the security protection has been performed.

12 Claims, 9 Drawing Sheets

(51) Int. Cl.
 *H04W 28/06* (2009.01)
 *H04W 52/02* (2009.01)
 *H04W 92/20* (2009.01)

(58) Field of Classification Search
 CPC ..... H04W 76/20; H04W 76/25; H04W 76/27; H04W 76/30; H04W 28/06; H04W 92/20
 See application file for complete search history.

(56) References Cited

U.S. PATENT DOCUMENTS

| | | | | |
|---|---|---|---|---|
| 2018/0213452 | A1* | 7/2018 | Kim | H04L 5/0053 |
| 2020/0029262 | A1* | 1/2020 | Kim | H04W 36/00 |
| 2020/0178204 | A1* | 6/2020 | Chen | H04W 76/27 |
| 2020/0214070 | A1* | 7/2020 | Ingale | H04W 74/0833 |
| 2020/0275512 | A1* | 8/2020 | Wu | H04W 76/27 |

FOREIGN PATENT DOCUMENTS

| | | |
|---|---|---|
| CN | 105898894 A | 8/2016 |
| CN | 106658758 A | 5/2017 |
| CN | 107484260 A | 12/2017 |
| WO | 2012154173 A1 | 11/2012 |
| WO | 2012158160 A1 | 11/2012 |

OTHER PUBLICATIONS

Intel Corporation, "Light Connection Feature specification in 36.331—TP agreements", 3GPP TSG-RAN WG2 Meeting #97 R2-1701688, Feb. 13-17, 2017, 34 pages, Athens, Greece.

Huawei et al.,: "Discussion on CN location Update and RNA Update for inactive state", 3GPP TSG-RAN WG2#99 Meeting, R2-1708712, Aug. 21-25, 2017, 3 pages, Berlin, Germany.

Huawei, "Periodic RAN-based notification area update", 3GPP TSG-RAN WG3 NR AdHoc, R3-172388, Qingdao, China, Jun. 27-29, 2017, 3 pages, Qingdao, China.

"3rd Generation Partnership Project; Technical Specification Group Radio Access Network; NG-RAN; Xn application protocol (XnAP) (Release 15)", 3GPP TS 38.423 V0.6.0 (Jan. 2018), Jan. 2018, 76 pages.

"3rd Generation Partnership Project; Technical Specification Group Services and System Aspects; Security architecture and procedures for 5G system (Release 15)", 3GPP TS 33.501 V0.7.0 (Jan. 2018), Jan. 2018, 109 pages.

"3rd Generation Partnership Project; Technical Specification Group Radio Access Network; NR; NR and NG-RAN Overall Description; Stage 2 (Release 15)", 3GPP TS 38.300 V15.0.0 (Dec. 2017), Dec. 2017, 68 pages.

Ericsson: "TS 38.423 version 0.6.0—Cover page", 3GPP TSG-RAN WG3 NR Adhoc 1801 Meeting, R3-180656, Jan. 22-26, 2018, 2 pages, Sophia Antipolis, France.

* cited by examiner

COMMUNICATION METHOD AND COMMUNICATIONS APPARATUS

CROSS-REFERENCE TO RELATED APPLICATIONS

This application is a continuation of International Application No. PCT/CN2019/074757, filed on Feb. 11, 2019, which claims priority to Chinese Patent Application No. 201810150970.8, filed on Feb. 13, 2018. The disclosures of the aforementioned applications are hereby incorporated by reference in their entireties.

TECHNICAL FIELD

Embodiments of this application relate to the field of communications technologies, and in particular, to a communication method and a communications apparatus.

BACKGROUND

An inactive state is a radio resource control (RRC) state, and is referred to as an "RRC inactive state" or an "inactive state" below. Similar to an idle state, in the inactive state, a terminal disconnects an RRC connection to a network, and there is no continuous data transmission. However, different from the idle state, in the inactive state, the terminal and an access network device store a context of the terminal, and the access network device allocates a radio access network notification area (RNA) to the terminal that enters the inactive state. An access network device that configures a terminal to enter an inactive state and stores context information of the terminal is usually referred to as a source network device or an anchor network device. However, as the terminal moves, the anchor network device may change, and a new anchor network device may appear.

The terminal may be in the RNA area for a long period of time, or may move out of the RNA area. When moving in the RNA area, the terminal does not need to notify the network even if the terminal selects another cell in the RNA. The network usually sends configuration information to the terminal. The configuration information may include information indicating a periodic radio access network notification area update (RNAU) timer and/or information indicating the RNA. When the terminal moves in the RNA area, the terminal sends a periodic RNAU message to notify the network, to determine status consistency between the network and the terminal. If the terminal sends an RNAU message to a network device (referred to as a target network device) different from the anchor network device, the target network device obtains the context information of the terminal from the anchor network device. Then, the target network device interacts with a core network device to switch a path between the terminal and the anchor network device to a path between the terminal and the target network device. The target network device determines, based on a quantity of times for which the terminal sends the RNAU message after the path switch is completed, whether the terminal enters the idle state from the inactive state. Due to mobility of the terminal, the target network device changes. In this case, a quantity of times of sending the RNAU message by the terminal when each new target network device is used may not exceed a maximum quantity of times. Therefore, the terminal keeps in an active state, and the terminal still periodically sends the RNAU message. Consequently, air interface signaling overheads are high, and power consumption of the terminal increases.

SUMMARY

Embodiments of this application provide a communication method and a communications apparatus, to prevent a terminal from staying in an inactive state for a long period of time, so that unnecessary air interface signaling overheads and energy consumption of the terminal are reduced.

According to a first aspect, an embodiment of this application provides a communication method, including: receiving, by a first network device, a first message, where the first network device is a network device to which a current serving cell of a terminal belongs, the first message includes first information of the terminal, and the first information includes at least one of the following: a quantity of times for which the terminal has initiated a radio access network notification area update when in an inactive state, or total duration for which the terminal is in the inactive state; and sending, by the first network device, a second message to the terminal based on the first information, where the second message is used to indicate the terminal to enter an idle state.

In this embodiment, the first network device determines, based on the total quantity of times for which the terminal has initiated the radio access network notification area update when in the inactive state and/or the total duration for which the terminal is in the inactive state, whether to configure the terminal to be in the idle state, preventing the terminal from staying in the inactive state for a long period of time, and reducing unnecessary air interface signaling overheads and power consumption of the terminal.

In a possible design, the receiving a first message includes: receiving, by the first network device, the first message from the terminal; or receiving, by the first network device, the first message from a second network device, where the second network device is a network device that configures the terminal to enter the inactive state.

In a possible design, the method further includes: sending, by the first network device, a third message to a core network device to notify the core network device that the terminal enters the idle state. Therefore, after determining, based on the first information of the terminal, to configure the terminal to enter the idle state, the first network device neither needs to establish a terminal-related connection to the core network device, nor needs to perform path switch (path switch), and may indicate the core network device to configure the terminal to enter the idle state.

In a possible design, the sending, by the first network device, a second message to the terminal based on the first information includes: when the quantity of times for which the terminal has initiated the radio access network notification area update after entering the inactive state is greater than or equal to a preset quantity of times, sending, by the first network device, the second message to the terminal; or when the total duration for the terminal is in the inactive state is greater than or equal to preset duration, sending, by the first network device, the second message to the terminal.

In a possible design, the radio access network notification area update is a periodic radio access network notification area update.

According to a second aspect, an embodiment of this application provides a communication method, including: sending a first message to a first network device, where the first message includes first information and information indicating a radio access network notification area update of a terminal, and the first network device is a network device to which a current serving cell of the terminal belongs; receiving a second message from the first network device, where the second message is used to indicate the terminal to enter an idle state, and the first information includes at least one of the following: a quantity of times for which the terminal has initiated a radio access network notification area update after entering an inactive state, or total duration for the terminal is in the inactive state; and entering the idle state according to the second message.

In this embodiment, with help of the first information, the first network device determines, based on the total quantity of times for which the terminal has initiated the radio access network notification area update when in the inactive state and/or the total duration for which the terminal is in the inactive state, whether to configure the terminal to be in the idle state, preventing the terminal from staying in the inactive state for a long period of time, and reducing unnecessary air interface signaling overheads and power consumption of the terminal.

In a possible design, the method further includes: sending a first message to the first network device, where the first message includes the first information and the information indicating the radio access network notification area update of the terminal.

In a possible design, the radio access network notification area update is a periodic radio access network notification area update.

In a possible design, the first message includes the information indicating the radio access network notification area update.

According to a third aspect, an embodiment of this application provides a communication method, including: sending, by the second network device, a first message to the first network device, where the first message includes first information of the terminal, and the first information includes at least one of the following: a quantity of times for which the terminal has sent a periodic radio access network notification area update after entering an inactive state, duration of a timer of the periodic radio access network notification area update, or total duration for the terminal is in the inactive state, where the first network device is a network device to which a current serving cell of the terminal belongs, and the second network device is a network device that configures the terminal to enter the inactive state.

In this embodiment, with help of the first information, the first network device determines, based on the total quantity of times for which the terminal has initiated the radio access network notification area update when in the inactive state and/or the total duration for which the terminal is in the inactive state, whether to configure the terminal to be in the idle state, preventing the terminal from staying in the inactive state for a long period of time, and reducing unnecessary air interface signaling overheads and power consumption of the terminal.

In a possible design, the method further includes: receiving, by the second network device, a fourth message from the first network device, where the fourth message includes information used to indicate that the terminal initiates a radio access network notification area update.

In a possible design, the radio access network notification area update is a periodic radio access network notification area update.

In a possible design, the fourth message is a context request message, and the first message is a context response message.

According to a fourth aspect, an embodiment of this application provides a communications apparatus, used as a first network device and including: a receiving module, configured to receive a first message, where the first network device is a network device to which a current serving cell of a terminal belongs, the first message includes first information of the terminal, and the first information includes at least one of the following: a quantity of times for which the terminal has initiated a radio access network notification area update when in an inactive state, or total duration for which the terminal is in the inactive state; and a sending module, configured to send a second message to the terminal, where the second message is determined based on the first information and is used to indicate the terminal to enter an idle state.

In this embodiment, the first network device determines, based on the total quantity of times for which the terminal has initiated the radio access network notification area update when in the inactive state and/or the total duration for which the terminal is in the inactive state, whether to configure the terminal to be in the idle state, preventing the terminal from staying in the inactive state for a long period of time, and reducing unnecessary air interface signaling overheads and power consumption of the terminal.

In a possible design, the receiving module is configured to: receive the first message from the terminal; or receive the first message from a second network device, where the second network device is a network device that configures the terminal to enter the inactive state.

In a possible design, the sending module is further configured to send a third message to a core network device, to notify the core network device that the terminal enters the idle state. Therefore, in this embodiment, after determining, based on the first information of the terminal, to configure the terminal to enter the idle state, the first network device neither needs to establish a terminal-related connection to the core network device, nor needs to perform path switch (path switch), and may indicate the core network device to configure the terminal to enter the idle state.

In a possible design, the sending module is configured to: when the quantity of times for which the terminal has initiated the radio access network notification area update after entering the inactive state is greater than or equal to a preset quantity of times, send the second message to the terminal; or when the total duration for the terminal is in the inactive state is greater than or equal to preset duration, send the second message to the terminal.

In a possible design, the radio access network notification area update is a periodic radio access network notification area update.

It should be noted that the communications apparatus in the fourth aspect may be a network device, or may be a component that may be used in a network device.

According to a fifth aspect, an embodiment of this application provides a communications apparatus, including: a receiving module, configured to receive a second message from a first network device, where the second message is used to indicate a terminal to enter an idle state, the second message is based on first information of the terminal, and the first information includes at least one of the following: a quantity of times for which the terminal has initiated a radio access network notification area update after entering an inactive state, or total duration for the terminal is in the inactive state, where the first network device is a network device to which a current serving cell of the terminal belongs; and a processing module, configured to enter the idle state according to the second message.

In this embodiment, with help of the first information, the first network device determines, based on the total quantity of times for which the terminal has initiated the radio access network notification area update when in the inactive state and/or the total duration for which the terminal is in the inactive state, whether to configure the terminal to be in the idle state, preventing the terminal from staying in the inactive state for a long period of time, and reducing unnecessary air interface signaling overheads and power consumption of the terminal.

In a possible design, the apparatus further includes: a sending module, configured to send a first message to the first network device, where the first message includes the first information and information indicating the radio access network notification area update of the terminal.

In a possible design, the radio access network notification area update is a periodic radio access network notification area update.

In a possible design, the first message includes the information indicating the radio access network notification area update.

It should be noted that the communications apparatus in the fifth aspect may be a terminal, or may be a component of be used in a terminal.

According to a sixth aspect, an embodiment of this application provides a communications apparatus, used as a second network device and including: a sending module, configured to send a first message to a first network device, where the first message includes first information of a terminal, and the first information includes at least one of the following: a quantity of times for which the terminal has sent a periodic radio access network notification area update after entering an inactive state, duration of a timer of the periodic radio access network notification area update, or total duration for the terminal is in the inactive state, where the first network device is a network device to which a current serving cell of the terminal belongs, and the second network device is a network device that configures the terminal to enter the inactive state.

In this embodiment, with help of the first information, the first network device determines, based on the total quantity of times for which the terminal has initiated the radio access network notification area update when in the inactive state and/or the total duration for which the terminal is in the inactive state, whether to configure the terminal to be in the idle state, preventing the terminal from staying in the inactive state for a long period of time, and reducing unnecessary air interface signaling overheads and power consumption of the terminal.

In a possible design, the communications apparatus further includes: a receiving module, configured to receive a fourth message from the first network device, where the fourth message includes information used to indicate that the terminal initiates a radio access network notification area update.

In a possible design, the radio access network notification area update is a periodic radio access network notification area update.

In a possible design, the fourth message is a context request message, and the first message is a context response message.

It should be noted that the communications apparatus in the sixth aspect may be a network device, or may be a component of be used in a network device.

According to a seventh aspect, an embodiment of this application provides a communications apparatus, including a receiver and a transmitter. The receiver and the transmitter are configured to perform the communication method according to any one of the embodiments in the first aspect or the third aspect of this application.

In a possible manner, the communications apparatus in the seventh aspect may further include a processor, configured to implement a corresponding processing or control operation.

According to an eighth aspect, an embodiment of this application provides a communications apparatus, including a receiver, a transmitter, and a processor. The receiver, the transmitter, and the processor are configured to perform the communication method according to any one of the embodiments in the second aspect of this application.

According to a ninth aspect, an embodiment of this application provides a chip, including a memory and a processor. The memory is configured to store a program instruction, and the processor is configured to invoke the program instruction in the memory to perform the communication method according to any one of the embodiments in the first aspect, the second aspect, or the third aspect of this application.

According to a tenth aspect, an embodiment of this application provides a readable storage medium. The readable storage medium stores a computer program. When the computer program is executed, the communication method according to any one of the embodiments in the first aspect, the second aspect, or the third aspect of this application is implemented.

According to an eleventh aspect, an embodiment of this application provides a communication method, including: receiving, by a second network device, a fifth message from a first network device, where the fifth message includes information used to indicate that a terminal initiates a periodic radio access network notification area update; and sending, by the second network device, a sixth message to the first network device based on the fifth message, where the sixth message includes information used to indicate the terminal to enter an idle state, where the first network device is a network device to which a current serving cell of the terminal belongs, and the second network device is a network device that configures the terminal to enter the inactive state.

Therefore, even if the second network device does not receive a message that is sent by the terminal and that includes information used to indicate the periodic radio access network notification area update, the second network device may still perform a release operation, so that the terminal enters the idle state, preventing the terminal from staying in the inactive state for a long period of time, and reducing unnecessary air interface signaling overheads and energy consumption of the terminal.

In a possible design, the method further includes: sending, by the second network device, a security parameter of the terminal to the first network device, where the security parameter includes a security algorithm and a key derived based on information about the current serving cell of the terminal, or the security parameter includes a security algorithm and a next hop key chaining count, where the security algorithm includes an integrity protection algorithm, or the security algorithm includes an integrity protection algorithm and an encryption algorithm. Therefore, the first network device sends a message to the terminal based on the security parameter of the terminal, to ensure security of the message sent by the first network device to the terminal.

In a possible design, the method further includes: sending, by the second network device, capability information of the terminal or a dedicated mobility control parameter of the terminal to the first network device. Therefore, the first network device sends the dedicated mobility control parameter of the terminal to the terminal, so that the terminal performs cell reselection based on the dedicated mobility control parameter after entering the idle state.

In a possible design, the sending, by the second network device, a sixth message to the first network device includes: performing, by the second network device, security protection on the sixth message, and sending, to the first network device, the sixth message on which the security protection has been performed, where the security protection includes integrity protection, or the security protection includes integrity protection and encryption. This ensures security of a message transparently transmitted by the second network device to the terminal via the first network device.

In a possible design, a key used for the security protection includes at least one of the following: a stored old key, a first new key, or a second new key, where the old key is a key used when configuring the terminal to enter the inactive state, the first new key is a key derived by the second network device based on the old key and the information about the current serving cell of the terminal, and the second new key includes a next hop key chaining count.

In a possible design, the performing, by the second network device, security protection includes: performing, by the second network device, the security protection based on a packet data convergence protocol sequence number (PDCP SN), where the PDCP SN is carried in the fifth message, the PDCP SN is equal to a preset sequence number, or the PDCP SN is equal to a PDCP SN stored in the terminal.

In a possible design, the method further includes: receiving, by the second network device, the information about the current serving cell of the terminal from the first network device, where the information about the serving cell includes at least one of a physical cell identifier, an absolute radio frequency channel number, or a global cell identifier that are of the serving cell. Therefore, the second network device derives, based on the information about the current serving cell of the terminal, the key for performing security protection.

In a possible design, the sending, by the second network device, a sixth message to the first network device based on the fifth message includes: updating, by the second network device based on the fifth message, the quantity of times that is recorded in the second network device and for which the terminal initiates the periodic radio access network notification area update; and when an updated quantity of times is greater than or equal to a preset quantity of times, sending, by the second network device, the sixth message to the first network device.

According to a twelfth aspect, an embodiment of this application provides a communication method, including: sending, by a first network device, a fifth message to a second network device after receiving, from a terminal, a message including information used to indicate that the terminal initiates a radio access network notification area update, where the fifth message includes the information used to indicate that the terminal initiates the radio access network notification area update; receiving, by the first network device, a sixth message from the second network device, where the sixth message includes information used to indicate the terminal to enter an idle state; and configuring, by the first network device according to the sixth message, the terminal to enter the idle state, where he first network device is a network device to which a current serving cell of the terminal belongs, and the second network device is a network device that configures the terminal to enter the inactive state.

Therefore, even if the second network device does not receive a message that is sent by the terminal and information used to indicate the periodic radio access network notification area update, the second network device may still perform a release operation, so that the terminal enters the idle state, preventing the terminal from staying in the inactive state for a long period of time, and reducing unnecessary air interface signaling overheads and energy consumption of the terminal.

In a possible design, the configuring, by the first network device according to the sixth message, the terminal to enter the idle state includes: sending, by the first network device, a seventh message to the terminal based on the sixth message, where the seventh message includes the information used to indicate the terminal to enter the idle state.

In a possible design, the method further includes: receiving, by the first network device, a security parameter of the terminal from the second network device, where the security parameter includes a security algorithm and a key derived based on information about the current serving cell of the terminal; or the security parameter includes a security algorithm and a next hop key chaining count, where the security algorithm includes an integrity protection algorithm, or the security algorithm includes an integrity protection algorithm and an encryption algorithm. Therefore, the first network device may successfully obtain, based on the security parameter of the terminal, the information in the message sent by the second network device.

In a possible design, the sending, by the first network device, a seventh message to the terminal based on the sixth message includes: performing, by the first network device, security protection on the seventh message based on the security parameter, and sending, to the terminal, the seventh message on which the security protection has been performed. Therefore, security of the seventh message sent by the first network device to the terminal is ensured.

In a possible design, the method further includes: receiving, by the first network device, a dedicated mobility control parameter of the terminal from the second network device. Alternatively, the sixth message further includes capability information of the terminal, and the method further includes: obtaining, by the first network device, the dedicated mobility control parameter of the terminal based on the capability information of the terminal, where the seventh message further includes the dedicated mobility control parameter of the terminal. Therefore, after entering the idle state, the terminal performs cell reselection based on the dedicated mobility control parameter.

In a possible design, the configuring, by the first network device according to the sixth message, the terminal to enter the idle state includes: sending, by the first network device, the sixth message to the terminal. In this embodiment, the first network device may transparently transmit, to the terminal, the sixth message sent by the second network device.

In a possible design, the fifth message further includes a PDCP SN, and the PDCP SN is used by the second network device to perform security protection.

In a possible design, the method further includes: sending, by the first network device, the information about the current serving cell of the terminal to the second network device, where the information about the serving cell includes at least one of a physical cell identifier, an absolute radio frequency channel number, or a global cell identifier that are of the serving cell. Therefore, the second network device derives, based on the information about the current serving cell of the terminal, the key for performing security protection.

According to a thirteenth aspect, an embodiment of this application provides a communications apparatus, used as a second network device and including: a receiving module, configured to receive a fifth message from a first network device, where the fifth message includes information used to indicate that a terminal initiates a periodic radio access network notification area update; and a sending module, configured to send a sixth message to the first network device, where the sixth message includes information used to indicate the terminal to enter an idle state, and the sixth message is determined based on the fifth message, where the first network device is a network device to which a current serving cell of the terminal belongs, and the second network device is a network device that configures the terminal to enter the inactive state.

Therefore, even if the second network device does not receive a message that is sent by the terminal and used to indicate the periodic radio access network notification area update, the second network device may still perform a release operation, so that the terminal enters the idle state, preventing the terminal from staying in the inactive state for a long period of time, and reducing unnecessary air interface signaling overheads and energy consumption of the terminal.

In a possible design, the sending module is further configured to send a security parameter of the terminal to the first network device, where the security parameter includes a security algorithm and a key derived based on information about the current serving cell of the terminal, or the security parameter includes a security algorithm and a next hop key chaining count, where the security algorithm includes an integrity protection algorithm, or the security algorithm includes an integrity protection algorithm and an encryption algorithm. Therefore, the first network device sends a message to the terminal based on the security parameter of the terminal, to ensure security of the message sent by the first network device to the terminal.

In a possible design, the sending module is further configured to send capability information of the terminal or a dedicated mobility control parameter of the terminal to the first network device. Therefore, the first network device sends the dedicated mobility control parameter of the terminal to the terminal, so that the terminal performs cell reselection based on the dedicated mobility control parameter after entering the idle state.

In a possible design, the communications apparatus further includes: a processing module, configured to perform security protection on the sixth message, where the sending module is configured to send, to the first network device, the sixth message on which the security protection has been performed, where the security protection includes integrity protection, or the security protection includes integrity protection and encryption. This ensures security of a message transparently transmitted by the second network device to the terminal via the first network device.

In a possible design, a key used for the security protection includes at least one of the following: a stored old key, a first new key, or a second new key, where the old key is a key used when configuring the terminal to enter the inactive state, the first new key is a key derived by the second network device based on the old key and the information about the current serving cell of the terminal, and the second new key includes a next hop key chaining count.

In a possible design, that the sending module performs security protection includes: the sending module performs the security protection based on a PDCP SN, where the PDCP SN is carried in the fifth message, the PDCP SN is equal to a preset sequence number, or the PDCP SN is equal to a PDCP SN stored in the terminal.

In a possible design, the receiving module is further configured to receive the information about the current serving cell of the terminal from the first network device, where the information about the serving cell includes at least one of a physical cell identifier, an absolute radio frequency channel number, or a global cell identifier that are of the serving cell. Therefore, the second network device derives, based on the information about the current serving cell of the terminal, the key for performing security protection.

In a possible design, the communications apparatus further includes: a processing module, configured to update, based on the fifth message, the quantity of times that is recorded in the second network device and for which the terminal initiates the periodic radio access network notification area update, where the sending module is configured to: when an updated quantity of times is greater than or equal to a preset quantity of times, send the sixth message to the first network device.

It should be noted that the communications apparatus in the thirteenth aspect may be a network device, or may be a component of be used in a network device.

According to a fourteenth aspect, an embodiment of this application provides a communications apparatus, used as a first network device and including: a receiving module, configured to receive, from a terminal, a message including information used to indicate that the terminal initiates a radio access network notification area update; and a sending module, configured to: after the receiving module receives, from the terminal, the message including the information used to indicate that the terminal initiates the radio access network notification area update, send a fifth message to a second network device, where the fifth message includes the information used to indicate that the terminal initiates the radio access network notification area update, where the receiving module is further configured to receive a sixth message from the second network device, where the sixth message includes information used to indicate the terminal to enter an idle state; and the sending module is further configured to configure, according to the sixth message, the terminal to enter the idle state, where the first network device is a network device to which a current serving cell of the terminal belongs, and the second network device is a network device that configures the terminal to enter the inactive state.

Therefore, even if the second network device does not receive a message that is sent by the terminal and used to indicate the periodic radio access network notification area update, the second network device may still perform a release operation, so that the terminal enters the idle state, preventing the terminal from staying in the inactive state for a long period of time, and reducing unnecessary air interface signaling overheads and energy consumption of the terminal.

In a possible design, the sending module is configured to: send a seventh message to the terminal, where the seventh message is determined based on the sixth message, and includes the information used to indicate the terminal to enter the idle state.

In a possible design, the receiving module is further configured to receive a security parameter of the terminal from the second network device, where the security parameter includes a security algorithm and a key derived based on information about the current serving cell of the terminal; or the security parameter includes a security algorithm and a next hop key chaining count, where the security algorithm includes an integrity protection algorithm, or the security algorithm includes an integrity protection algorithm and an encryption algorithm.

In a possible design, the communications apparatus further includes: a processing module, configured to perform security protection on the seventh message based on the security parameter, where the sending module is configured to send, to the terminal, the seventh message on which the security protection has been performed. Therefore, security of the seventh message sent by the first network device to the terminal is ensured.

In a possible design, the receiving module is further configured to receive a dedicated mobility control parameter of the terminal from the second network device. Alternatively, the sixth message further includes capability information of the terminal, and the receiving module is further configured to obtain the dedicated mobility control parameter of the terminal based on the capability information of the terminal, where the seventh message further includes the dedicated mobility control parameter of the terminal. Therefore, after entering the idle state, the terminal performs cell reselection based on the dedicated mobility control parameter.

In a possible design, the sending module is configured to: send the sixth message to the terminal. In this embodiment, the first network device may transparently transmit, to the terminal, the sixth message sent by the second network device.

In a possible design, the fifth message further includes a PDCP SN, and the PDCP SN is used by the second network device to perform security protection.

In a possible design, the sending module is further configured to send the information about the current serving cell of the terminal to the second network device, where the information about the serving cell includes at least one of a physical cell identifier, an absolute radio frequency channel number, or a global cell identifier that are of the serving cell. Therefore, the second network device derives, based on the information about the current serving cell of the terminal, the key for performing security protection.

It should be noted that the communications apparatus in the fourteenth aspect may be a network device, or may be a component of be used in a network device.

According to a fifteenth aspect, an embodiment of this application provides a communications apparatus, including a receiver and a transmitter. The receiver and the transmitter are configured to perform the communication method according to any one of the embodiments in the thirteenth aspect or the fourteenth aspect of this application.

According to a sixteenth aspect, an embodiment of this application provides a chip, including a memory and a processor. The memory is configured to store a program instruction, and the processor is configured to invoke the program instruction in the memory to perform the communication method according to any one of the embodiments in the thirteenth aspect or the fourteenth aspect of this application.

According to a seventeenth aspect, an embodiment of this application provides a readable storage medium. The readable storage medium stores a computer program. When the computer program is executed, the communication method according to any one of the embodiments in the thirteenth aspect or the fourteenth aspect of this application is implemented.

DETAILED DESCRIPTION OF ILLUSTRATIVE EMBODIMENTS

Figure 1A:
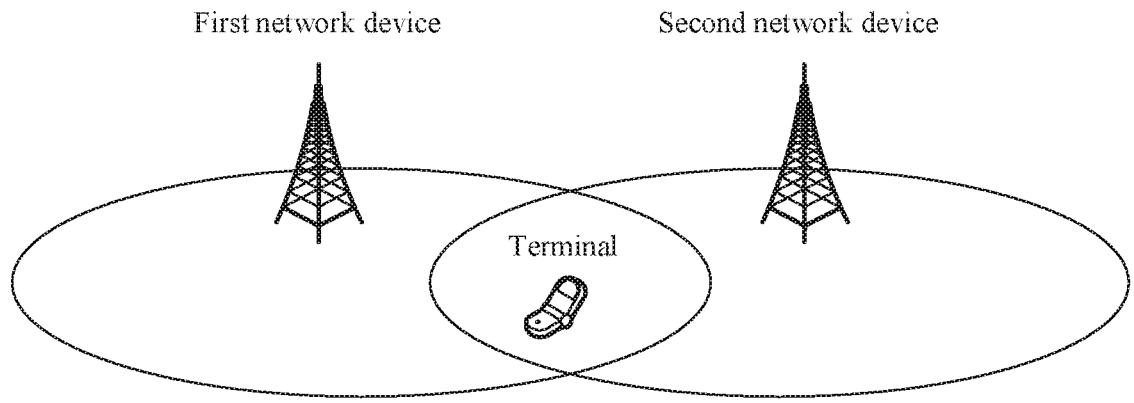
FIG. 1a is a schematic diagram of a communications system according to an embodiment of this application.

FIG. 1a is a schematic diagram of a communications system according to an embodiment of this application. As shown in FIG. 1a, the communications system includes at least two network devices and at least one terminal, and the at least two network devices communicate with the at least one terminal by using a technical solution provided in each of the following embodiments of this application. FIG. 1a shows two network devices, which are respectively a first network device and a second network device. FIG. 1a shows one terminal.

In the following, some terms in this application are described, to help a person skilled in the art have a better understanding.

Figure 1B:
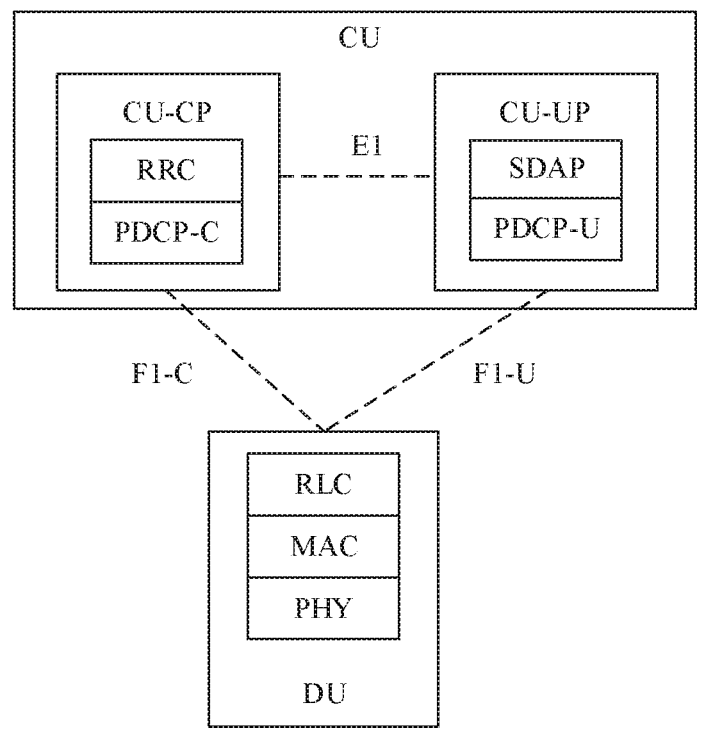
FIG. 1b is a schematic diagram of a protocol stack of a network device according to an embodiment of this application.

A network device is also referred to as a radio access network (RAN) device, is a device that enables a terminal to access a wireless network, and may be an evolved NodeB (eNB or eNodeB) in long term evolution (LTE), a relay station or an access point, or a base station in a 5G network, such as a transmission and reception point (TRP) or a controller. This is not limited herein. In a possible implementation, an access network device may be a base station (for example, a gNB) having a CU-DU separation architecture. As shown in FIG. 1b, FIG. 1b is a schematic diagram of a protocol stack of a network device according to an embodiment of this application. The RAN device may be connected to a core network device (for example, an LTE core network or a 5G core network). The CU and the DU may be understood as division of a base station from a logical function perspective. The CU and the DU may be physically separated or physically deployed together. A plurality of DUs may share one CU. One DU may alternatively be connected to a plurality of CUs (not shown in the figure). The CU and the DU may be connected by using an interface, for example, an F1 interface. Division into the CU and the DU may be based on protocol layers of a wireless network. For example, functions of a radio resource control (RRC) layer, a service data adaptation protocol (SDAP) layer, and a packet data convergence protocol (PDCP) layer are provided by the CU, and functions of a radio link control (RLC) layer, a media access control (MAC) layer, a physical layer, and the like are provided by the DU. It may be understood that, division of processing functions of the CU and the DU based on the protocol layers is merely an example, and the processing functions of the CU and the DU may alternatively be divided in another manner. For example, in different divisions, the CU or the DU may have more protocol layers. For example, the CU or the DU may alternatively have some processing functions of protocol layers after division. In a design, some functions of the RLC layer and a function of a protocol layer above the RLC layer are provided by the CU, and a remaining function of the RLC layer and a function of a protocol layer below the RLC layer are provided by the DU. In another design, functions of the CU or the DU may alternatively be divided based on a service type or another system requirement. For example, division is performed based on a delay. Functions whose processing time needs to meet a delay requirement are provided by the DU, and functions that do not need to meet the delay requirement are provided by the CU. In another design, the CU may alternatively have one or more functions of the core network. One or more CUs may be set in a centralized manner or a separated manner. For example, the CUs may be disposed on a network side for centralized management. The DU may have a plurality of radio frequency functions, and the radio frequency functions may be remotely set.

Functions of the CU may be implemented by one entity, or may be implemented by different entities. For example, the functions of the CU may be further divided. For example, a control plane (CP) is separated from a user plane (UP), that is, a control plane of the CU (CU-CP) is separated from a user plane of the CU (CU-UP). For example, the CU-CP and the CU-UP may be implemented by different function entities. The CU-CP and the CU-UP may be coupled to the DU to jointly implement functions of the base station. In a possible implementation, the CU-CP is responsible for a control plane function, and mainly includes RRC and PDCP-C. The PDCP-C is mainly responsible for data encryption and decryption, integrity protection, data transmission, and the like on the control plane. The CU-UP is responsible for user plane functions, and mainly includes SDAP and PDCP-U. The SDAP is mainly responsible for processing data of the core network and mapping a data flow to a bearer. The PDCP-U is mainly responsible for encryption and decryption, integrity protection, header compression, serial number maintenance, data transmission, and the like on a data plane. The CU-CP is connected to the CU-UP by using an E1 interface. The CU-CP represents that the gNB is connected to the core network by using an Ng interface. The CU-CP is connected to the DU by using an F1-C (control plane) interface. The CU-UP is connected to the DU by using an F1-U (user plane) interface. Certainly, another possible implementation is that the PDCP-C is also in the CU-UP.

A terminal may be a wireless terminal or a wired terminal. The wireless terminal may refer to a device having a wireless transceiver function, and may be deployed on land, including indoors, outdoors, in a handheld manner, or in an in-vehicle manner, or may be deployed on a water surface (for example, on a ship), or may be deployed in the air (for example, on an airplane, a balloon, or a satellite). The terminal may be a mobile phone, a tablet computer (Pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in smart grid, a wireless terminal in transportation safety, a wireless terminal in smart city, a wireless terminal in smart home, or the like. This is not limited herein.

Figure 2:
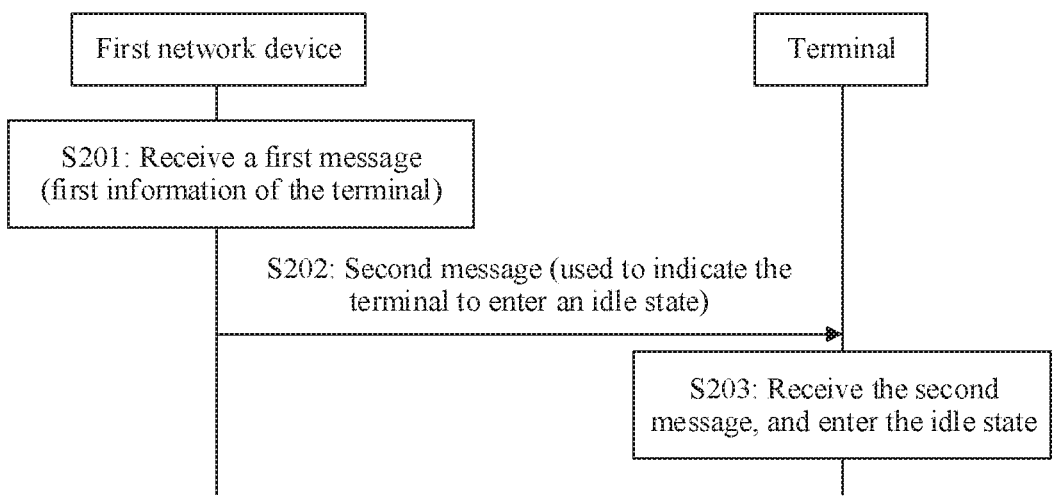
FIG. 2 is a flowchart of a communication method according to an embodiment of this application.

FIG. 2 is a flowchart of a communication method according to an embodiment of this application. As shown in FIG. 2, the method in this embodiment may include the following steps.

S201: A first network device receives a first message.

When a terminal is in an inactive state, the terminal disconnects an RRC connection to a network device, but both the terminal and the network device store context information of the terminal. A core network device (for example, an AMF) may store the context information of the terminal, or may store a connection established through an interface between the network device and the core network device for the terminal. The network device allocates an RNA area to the terminal in the inactive state. In the embodiments of this application, the network device (for example, an anchor base station) that configures the terminal to enter the inactive state is referred to as a second network device. The terminal has mobility. The terminal may move out of the RNA area allocated by the second network device to the terminal, and the terminal may move to another cell. In this case, a current serving cell of the terminal changes to the another cell, and a network device to which the another cell belongs may be different from the second network device. Herein, the network device may be referred to as a first network device.

In a possible implementation, the current serving cell of the terminal may be a cell in which the terminal is currently located, and the terminal may receive a system message, a paging message, and the like in the cell.

In a possible implementation, the first message may include first information of the terminal, and the first information includes at least one of the following: a quantity of times for which the terminal has initiated a radio access network notification area update (RNAU) after entering the inactive state, or total duration for which the terminal is in the inactive state. For example, each time the terminal moves out of the configured RNA, it may be considered that the terminal initiates an RNAU; or, if the RNAU is periodic, each time a periodicity time expires, it is considered that the terminal initiates an RNAU.

Optionally, the RNAU may be a periodic RNAU. In this case, the first information may include a quantity of times for which the terminal has initiated the periodic RNAU when in the inactive state and a periodicity of the RNAU. The total duration for which the terminal is in the inactive state may be obtained based on the quantity of times for which the terminal has initiated the periodic RNAU when in the inactive state and the periodicity of the RNAU.

In some embodiments, the first network device may receive the first message from the terminal. The first message may include information used to indicate that the terminal initiates the RNAU. For example, the first message is a resume request message. In a possible implementation, when the terminal initiates the RNAU, the terminal sends the resume request message to the first network device. The resume request message includes information indicating the RNAU. Alternatively, when the terminal needs to send uplink data and/or access stratum signaling, or the like to the first network device, the terminal does not need to indicate the RNAU to the network device, but the terminal still sends the resume request message to the first network device. The resume request message sent in these cases does not need to include the information used to indicate that the terminal initiates the RNAU.

In some embodiments, the first network device may receive the first message from the second network device. Optionally, before receiving the first message from the second network device, the first network device may further send a fourth message to the second network device. The fourth message may include information used to indicate, to the second network device, that the terminal initiates the RNAU. For example, after receiving, from the terminal, the message including the information used to indicate that the terminal initiates the RNAU, the first network device sends the fourth message to the second network device. For example, the fourth message may be a context request message, and the first message may be a context response message. In some other embodiments, the fourth message may not include the information used to indicate, to the second network device, that the terminal initiates the RNAU. The fourth message is a notification message, and the fourth message may indicate that the terminal initiates the RNAU. The fourth message is, for example, a new message.

S202: The first network device sends a second message to the terminal.

In this embodiment, the first network device determines, based on the first information of the terminal, to configure the terminal to be in an idle state, and then sends the second message to the terminal. The second message is used to indicate the terminal to enter the idle state.

In a possible implementation, if the first information of the terminal includes the quantity of times for which the terminal has initiated the RNAU when in the inactive state, when determining, based on the first information, that the quantity of times for which the terminal has initiated the RNAU when in the inactive state is greater than or equal to a preset quantity of times, the first network device determines to configure the terminal to be in the idle state.

In another possible implementation, if the first information of the terminal includes the quantity of times for which the terminal has initiated the periodic RNAU when in the inactive state and the periodicity of the periodic RNAU, when determining, based on the first information, that the quantity of times for which the terminal has initiated the periodic RNAU when in the inactive state is greater than or equal to a preset quantity of times, the first network device determines to configure the terminal to be in the idle state. Alternatively, the first network device may determine, based on the quantity of times for which the terminal has initiated the periodic RNAU and the periodicity of the RNAU, the total duration for which the terminal is in the inactive state, and determine to configure the terminal to be in the idle state when the total duration for which the terminal is in the inactive state is greater than or equal to preset duration.

The quantity of times (for which the terminal has initiated the RNAU when in the inactive state) included in the first information may include a quantity of times for which the terminal currently initiates the RNAU to the first network device. The first network device compares the quantity of times included in the first information with the preset quantity of times, to determine whether to configure the terminal to be in the idle state. Alternatively, the quantity of times (namely, the quantity of times for which the terminal has initiated the RNAU when in the inactive state) included in the first information may not include a quantity of times for which the terminal currently initiates the RNAU to the first network device. After receiving the first information, the first network device compares the preset quantity of times and a sum of 1 and the quantity of times that is included in the first information and for which the terminal has initiated the RNAU when in the inactive state, to determine whether to configure the terminal to be in the idle state.

In still another implementation, if the first information of the terminal includes the total duration for which the terminal is in the inactive state, or if the first network device obtains, based on the first information of the terminal, the total duration for which the terminal is in the inactive state, when determining that total duration for the terminal is in the inactive state is greater than or equal to the preset duration, the first network device determines to configure the terminal to be in the idle state. For the duration for the terminal is in the inactive state, timing may start when the second network device configures the terminal to be in the inactive state. For example, the second network device may start timing when sending, to the terminal, configuration information for configuring the terminal to enter the inactive state, or the second network device may start timing when receiving a response acknowledgment message sent by the terminal, where the response acknowledgment message includes indication information used to acknowledge that the configuration information is received.

S203: The terminal receives the second message, and enters the idle state.

In this embodiment, the terminal receives the second message from the first network device. The second message is used to indicate the terminal to enter the idle state. Then, even if the terminal is in the idle state, the terminal enters the idle state according to the second message.

That the terminal is in the idle state means that the terminal disconnects the RRC connection to the network device and does not need to receive downlink data, to save power. In addition, the terminal and the network device no longer store the context information of the terminal, and there is no connection of the terminal between the network device and the core network device. After receiving the second message, the terminal releases the context information of the terminal stored in the terminal, to enter the idle state.

It may be understood that the terminal or the network device (the first network device or the second network device) may perform some or all of the steps in the foregoing embodiment. These steps or operations are merely examples. In the embodiments of this application, another operation or variations of various operations may further be performed. In addition, the steps may be performed in a sequence different from that presented in the foregoing embodiment, and possibly, not all operations in the foregoing embodiment need to be performed.

In this embodiment, the first network device receives the first message. The first message includes the first information of the terminal, and the first information includes at least one of the following: the quantity of times for which the terminal has initiated the RNAU when in the inactive state, or the total duration for which the terminal is in the inactive state. After receiving the first message from the terminal, the first network device sends the second message to the terminal. After receiving the second message, the terminal enters the idle state. In this embodiment, the first network device determines, based on the quantity of times for which the terminal has initiated the RNAU when in the inactive state and/or the total duration for which the terminal is in the inactive state, whether to configure the terminal to be in the idle state, preventing the terminal from staying in the inactive state for a long period of time, and reducing unnecessary air interface signaling overheads and power consumption of the terminal.

Figure 3:
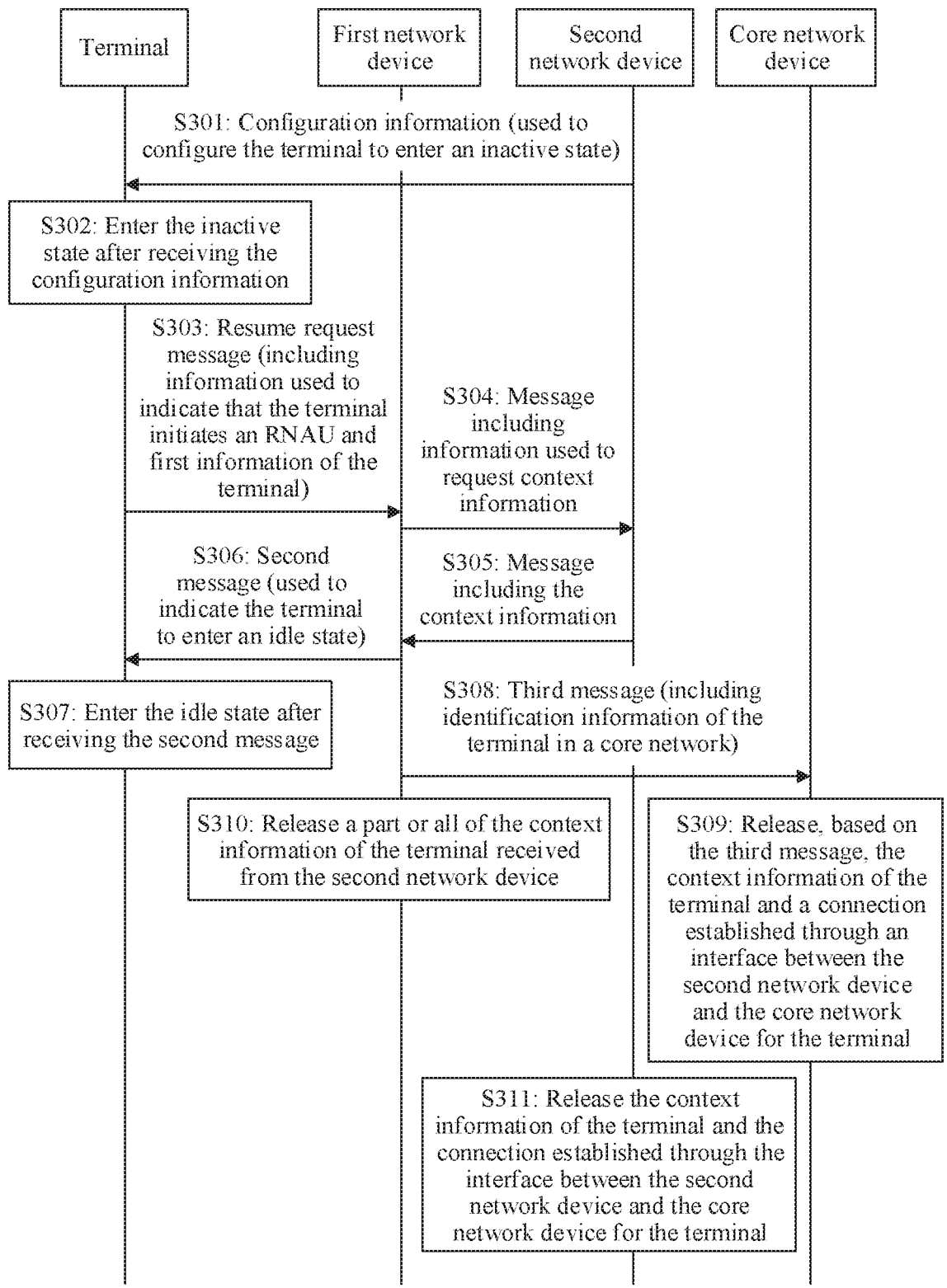
FIG. 3 is a flowchart of a communication method according to another embodiment of this application.

FIG. 3 is a flowchart of a communication method according to another embodiment of this application. As shown in FIG. 3, this embodiment is described by using an example in which a first network device receives a first message from a terminal. The method in this embodiment may include the following steps.

S301: A second network device sends configuration information to the terminal.

In this embodiment, a network device that configures the terminal to enter an inactive state is referred to as a second network device. The second network device sends the configuration information to the terminal, to configure the terminal to enter the inactive state. The configuration information may include information indicating a timer of a periodic RNAU and/or information indicating an RNA.

S302: After receiving the configuration information, the terminal enters the inactive state.

Optionally, if the configuration information includes the information indicating the timer of the periodic RNAU, the terminal starts the timer of the RNAU.

In this embodiment, after receiving the configuration information, the terminal enters the inactive state. For an explanation of the inactive state, refer to related descriptions in the foregoing embodiment, and details are not described herein again.

Optionally, after entering the inactive state, the terminal starts the timer of the RNAU. If the terminal is still in the RNA when the timer of the RNAU expires, the terminal sends, to the second network device, a message including information used to indicate that the terminal initiates an RNAU, to indicate, to the second network device, that the terminal initiates the RNAU. The RNAU herein may be a periodic RNAU or an aperiodic RNAU. If the terminal moves out of the configured RNA or when the timer of the RNAU expires, the terminal sends, to a network device (namely, the first network device) to which a current serving cell of the terminal belongs, a message including information used to indicate that the terminal initiates an RNAU. Optionally, the message includes the information used to indicate, to the first network device, that the terminal initiates the RNAU when moving out a range of the RNA. In the following, the message including the information used to indicate that the terminal initiates the RNAU is, for example, a resume request message. However, this embodiment is not limited to the message name.

It should be noted that S301 and S302 may be performed before S303, but it is not required that both S301 and S302 be performed before S303 is performed each time.

S303: The terminal sends the resume request message to the first network device.

It may be understood that, in this embodiment of this application, the resume request message sent by the terminal is an example of a first message.

The resume request message may include the information used to indicate that the terminal initiates the RNAU. The resume request message may include first information of the terminal. For the first information of the terminal, refer to descriptions in the foregoing embodiment, and details are not described herein again. Optionally, the resume request message may alternatively include information used to indicate that the RNAU initiated by the terminal is periodic.

S304: The first network device sends, to the second network device, a message including information used to request context information.

In this embodiment, after receiving the resume request message from the terminal, the first network device sends, to the second network device, the message including the information used to request the context information, to request the context information of the terminal. Optionally, the message including the information used to request the context information may further include the information used to indicate that the terminal initiates the RNAU, and may further include the information used to indicate that the terminal initiates the periodic RNAU or the information used to indicate that initiates the RNAU when moving out of the range of the RNA. Optionally, the message including the information used to request the context information is, for example, a context request message.

S305: The second network device sends a message including the context information to the first network device.

In this embodiment, after receiving the message that is sent by the first network device and that includes the information used to request the context information, the second network device sends, to the first network device, the message including the context information, for example, a context response message. The message includes a part or all of the context information of the terminal. The part of the context information may include at least a security parameter of the terminal. For details about the security parameter, refer to related descriptions in the following embodiments, and details are not described herein again. The security parameter of the terminal is used by the first network device to obtain a second message after performing security protection.

S306: The first network device sends the second message to the terminal.

In this embodiment, after receiving the message including the context information from the second network device, the first network device may send the second message to the terminal. The second message is used to indicate the terminal to enter an idle state.

In some embodiments, the first network device may determine, based on the first information of the terminal in the resume request message, to configure the terminal to be in the idle state. After determining to configure the terminal to be in the idle state, the first network device sends the second message to the terminal.

S307: The terminal enters the idle state after receiving the second message.

In this embodiment, after receiving the second message, according to the second message, the terminal releases the context information of the terminal, and enters the idle state.

Optionally, in this embodiment, S308 may further be included. Details are as follows:

S308: The first network device sends a third message to a core network device.

In this embodiment, the first network device sends the third message to the core network device to notify the core network device that the terminal enters the idle state. In some embodiments, the third message may include information used to notify the core network device that the terminal enters the idle state.

The part or all of the context information of the terminal in the context response message may further include identification information of the terminal in a core network. The identification information of the terminal in the core network may include at least one of the following: an access mobility management function (AMF) user equipment (UE) next generation application protocol (NGAP) identity (ID), a system architecture evolution temporary mobile subscriber identity (S-TMSI), or an international mobile subscriber identity (IMSI). The AMF UE NGAP ID is a core network access point identity of the terminal, and is used by the core network side device to uniquely identify the terminal over an interface between the core network device and the access network device. Correspondingly, the third message includes the identification information of the terminal in the core network.

S309: The core network device releases, based on the third message, the context information of the terminal and a connection established through an interface between the second network device and the core network device for the terminal.

In this embodiment, the core network device receives the third message from the first network device, and releases, based on the third message, the context information of the terminal and the connection established through the interface between the second network device and the core network device for the terminal.

The third message includes the identification information of the terminal in the core network device. The core network device determines, based on the identification information of the terminal in the core network device, the context information of the terminal stored in the core network, and further determines the connection established through the interface between the core network and the second network device for the terminal, so that the core network device may determine, based on the received identification information of the terminal that is sent by the first network device and in the core network device, the connection that needs to be released and that is established through the interface between the core network device and the second network device for the terminal. Therefore, the first network device may directly indicate the core network device to release a connection established through an interface between the core network device and another network device for the terminal. Therefore, after receiving the resume request message including the information used to indicate that the terminal initiates the RNAU, and determining, based on the first information of the terminal, to configure the terminal to be in the idle state, the first network device neither needs to establish a terminal-related connection to the core network device, nor needs to perform path switch.

S310: The first network device releases the part or all of the context information of the terminal received from the second network device.

In this embodiment, after determining to configure the terminal to be in the idle state, the first network device releases the part or all of the context information of the terminal received from the second network device in S305. This indicates that the terminal on the first network device side has entered the idle state.

Alternatively, in this embodiment, the following step may further be included:

S311: The second network device releases the context information of the terminal and the connection established through the interface between the second network device and the core network device for the terminal.

Optionally, after receiving, from the core network device, a message including information used to indicate to release the connection established through the interface between the second network device and the core network device for the terminal, the second network device releases the connection established through the interface between the second network device and the core network device for the terminal. After receiving, from the core network device, a message including information used to indicate to release the context information of the terminal, the second network device releases the context information of the terminal.

Optionally, after receiving, from the first network device, a message including information used to indicate to release the connection established through the interface between the second network device and the core network device for the terminal, the second network device releases the connection established through the interface between the second network device and the core network device for the terminal. After receiving, from the first network device, a message including information used to indicate to release the context information of the terminal, the second network device releases the context information of the terminal. Optionally, the message received by the second network device from the first network device further includes identification information of the terminal in the second network device, for example, an inter-base station interface protocol identity of the terminal in the second network device, for example, an inter-base station interface protocol identity (Old NG-RAN node UE XNAP ID) of UE on an old access network node.

It should be noted that a sequence of performing S306 and S307, S308 and S309, and S310 is not limited, and S311 may be performed after S309 or S310.

It may be understood that the terminal or the network device (the second network device or the first network device) may perform some or all of the steps in the foregoing embodiment. These steps or operations are merely examples. In the embodiments of this application, another operation or variations of various operations may further be performed. In addition, the steps may be performed in a sequence different from that presented in the foregoing embodiment, and possibly, not all operations in the foregoing embodiment need to be performed.

In this embodiment, the first network device obtains the first information of the terminal from the terminal based on the resume request message. The first information includes at least one of the following: a quantity of times for which the terminal has initiated the RNAU when in the inactive state, or total duration for which the terminal is in the inactive state. The first network device determines, based on the first information of the terminal, to configure the terminal to be in the idle state. In this embodiment, the first network device determines, based on the quantity of times for which the terminal has initiated the RNAU when in the inactive state and/or the total duration for which the terminal is in the inactive state, whether to configure the terminal to be in the idle state, preventing the terminal from staying in the inactive state for a long period of time, and reducing unnecessary air interface signaling overheads and power consumption of the terminal. Further, after determining to configure the terminal to be in the idle state, the first network device may directly indicate the core network device or the second network device to release the context information of the UE, and does not need to interact with the core network device to perform path switch. Therefore, unnecessary path switch signaling overheads are avoided.

Figure 4:
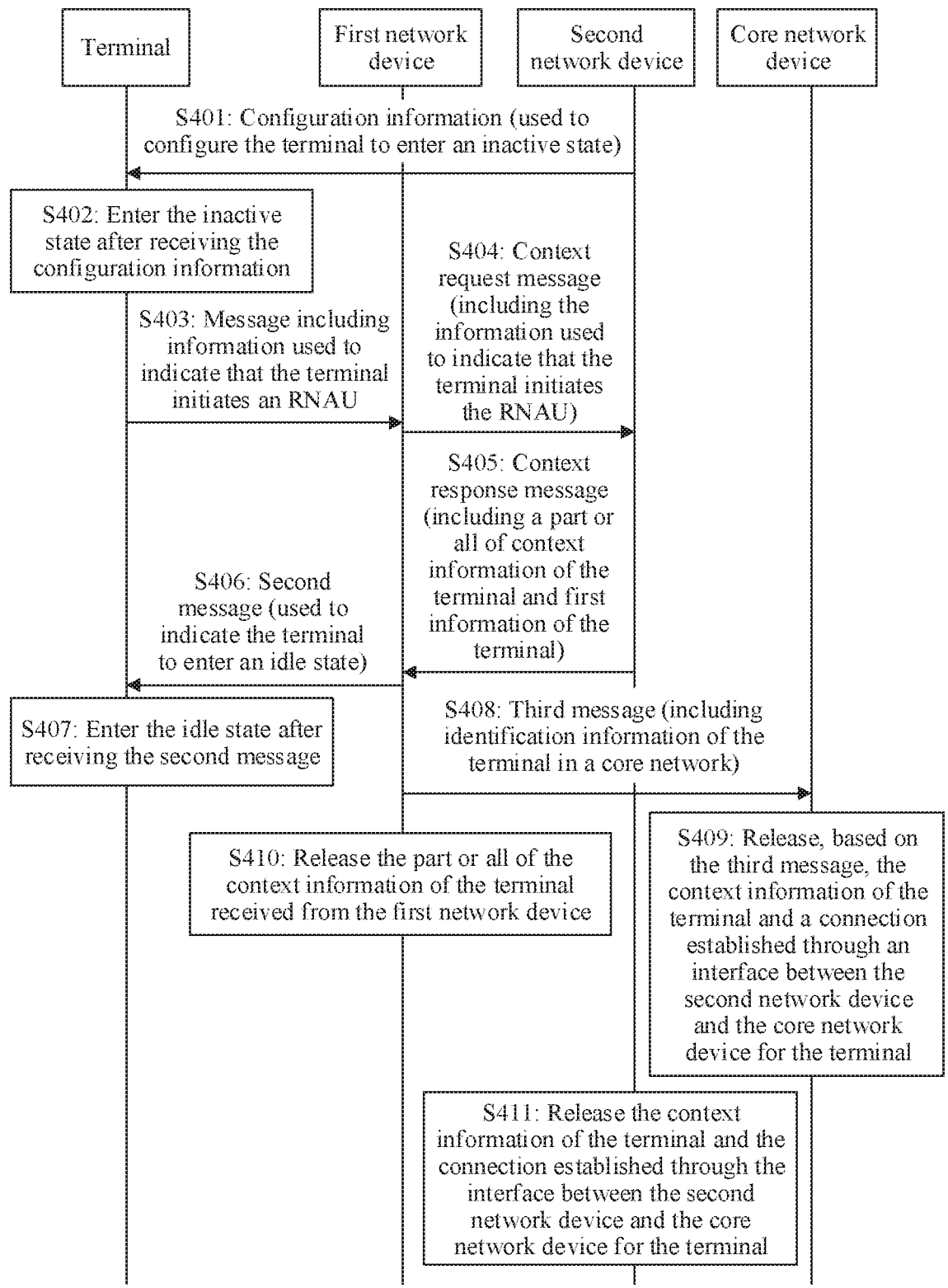
FIG. 4 is a flowchart of a communication method according to another embodiment of this application.

FIG. 4 is a flowchart of a communication method according to another embodiment of this application. As shown in FIG. 4, the method in this embodiment is described by using an example in which a fourth message is a context request message and a first message is a context response message. The method in this embodiment may include the following steps.

S401: A second network device sends configuration information to a terminal.

S402: After receiving the configuration information, the terminal enters an inactive state.

In this embodiment, for S401 and S402, refer to related descriptions of S301 and S302 in the foregoing embodiment, and details are not described herein again.

S403: The terminal sends, to a first network device, a message including information used to indicate that the terminal initiates an RNAU.

In this embodiment, if the terminal moves out of a configured RNA or when a timer of the RNAU expires, the terminal sends, to the first network device, the message including the information used to indicate that the terminal initiates the RNAU. For example, the message is a resume request message, and the resume request message includes information indicating that the terminal initiates the RNAU. Optionally, the RNAU may be a periodic RNAU.

S404: The first network device sends a context request message to the second network device.

It may be understood that, in this embodiment of this application, the context request message sent by the first network device is an example of the fourth message, and the context request message includes the information used to indicate that the terminal initiates the RNAU. For the context request message, refer to descriptions in the foregoing embodiment, and details are not described herein again.

S405: The second network device sends a context response message to the first network device.

It may be understood that, in this embodiment of this application, the context response message sent by the second network device is an example of the first message. After receiving the context request message sent by the first network device, the second network device sends the context response message to the first network device. The context response message includes a part or all of context information of the terminal. For the part or all of the context information, refer to descriptions in the foregoing embodiment. In addition, the context response message further includes first information of the terminal. For the first information of the terminal, refer to descriptions in the foregoing embodiment, and details are not described herein again.

S406: The first network device sends a second message to the terminal.

After receiving the context response message from the second network device, the first network device may send the second message to the terminal. The second message is used to indicate the terminal to enter an idle state.

In some embodiments, the first network device may determine, based on the first information of the terminal in the context response message, to configure the terminal to be in the idle state; and then send the second message to the terminal.

S407: The terminal enters the idle state after receiving the second message.

S408: The first network device sends a third message to a core network device.

S409: The core network device releases, based on the third message, the context information of the terminal and a connection established through an interface between the second network device and the core network device for the terminal.

S410: The first network device releases the part or all of the context information of the terminal received from the second network device.

Alternatively, in this embodiment, the following step is further included:

S411: The second network device releases the context information of the terminal and the connection established through the interface between the second network device and the core network device for the terminal.

For a specific implementation process of S406 to S411, refer to related descriptions in the embodiment shown in FIG. 3, and details are not described herein again.

It should be noted that a sequence of performing S406 and S407, S408 and S409, and S410 is not limited.

It may be understood that the terminal or the network device (the second network device or the first network device) may perform some or all of the steps in the foregoing embodiment. These steps or operations are merely examples. In the embodiments of this application, another operation or variations of various operations may further be performed. In addition, the steps may be performed in a sequence different from that presented in the foregoing embodiment, and possibly, not all operations in the foregoing embodiment need to be performed.

In this embodiment, the first network device obtains the first information of the terminal from the second network device by performing a context request process. The first information includes at least one of the following: a quantity of times for which the terminal has initiated the RNAU when in the inactive state, or total duration for which the terminal is in the inactive state. The first network device determines, based on the first information of the terminal, to configure the terminal to be in the idle state. In this embodiment, the first network device determines, based on a total quantity of times for which the terminal has initiated the RNAU when in the inactive state and/or the total duration for which the terminal is in the inactive state, whether to configure the terminal to be in the idle state, preventing the terminal from staying in the inactive state for a long period of time, and reducing unnecessary air interface signaling overheads and power consumption of the terminal. Further, after determining to configure the terminal to be in the idle state, the first network device directly indicates the core network device to release the context information of the UE, and does not need to interact with the core network device to perform path switch. Therefore, unnecessary path switch signaling overheads are avoided.

Optionally, the foregoing embodiment is mainly described by using an example in which the first network device indicates the terminal to enter the idle state, and the following embodiment is mainly described by using an example in which the second network device indicates the terminal to enter the idle state.

Figure 5:
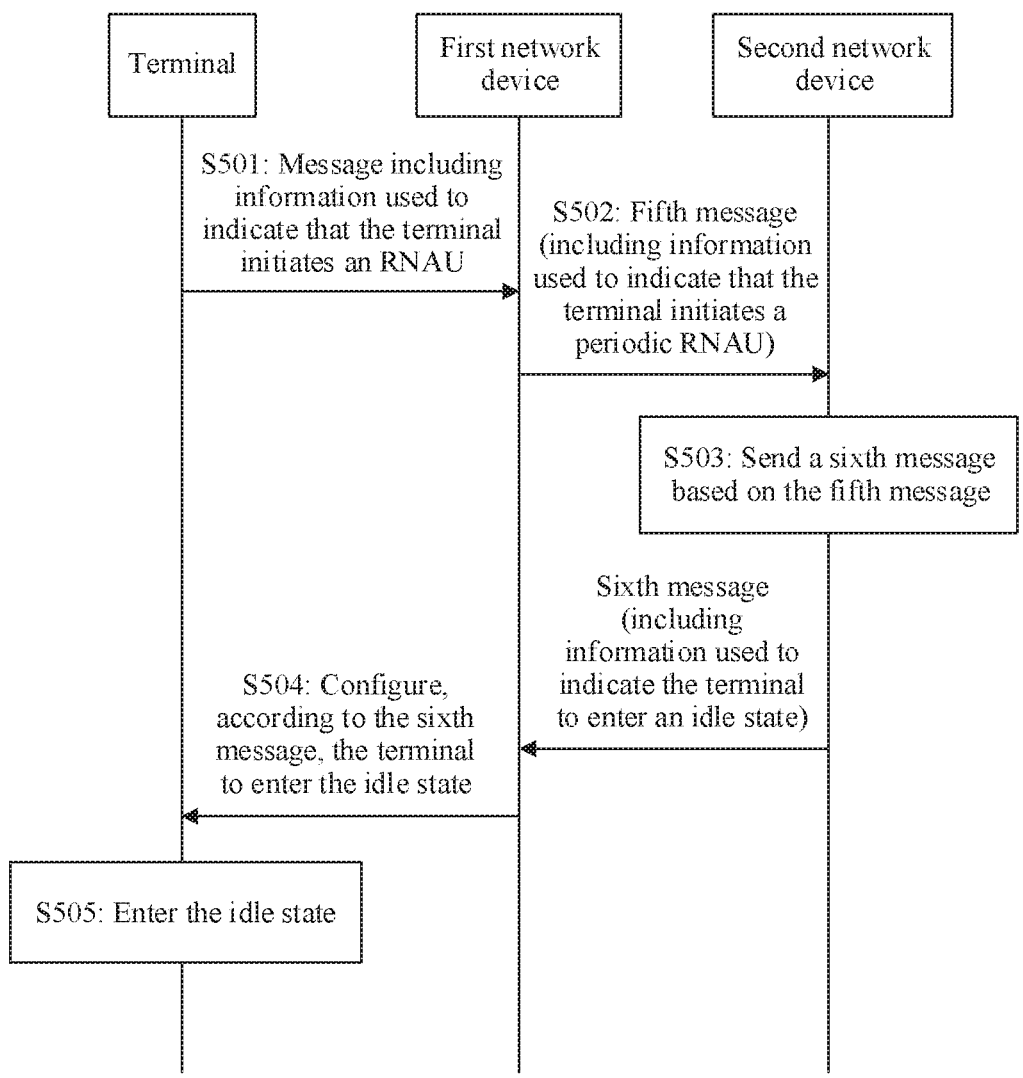
FIG. 5 is a flowchart of a communication method according to another embodiment of this application.

FIG. 5 is a flowchart of a communication method according to another embodiment of this application. As shown in FIG. 5, the method in this embodiment may include the following steps.

S501: A terminal sends, to a first network device, a message including information used to indicate that the terminal initiates an RNAU.

In this embodiment, the terminal is currently in an inactive state, and the terminal initiates a periodic RNAU to the first network device. For example, the terminal sends, to the first network device, the message including the information used to indicate that the terminal initiates the RNAU (for example, a periodic RNAU), to indicate, to the first network device, that the terminal initiates the RNAU. For example, the message may be a resume request message, and the resume request message includes the information used to indicate that the terminal initiates the RNAU. For a specific implementation process, refer to related descriptions in the embodiment shown in FIG. 3.

S502: The first network device sends a fifth message to a second network device.

In this embodiment, for definitions of the first network device and the second network device, refer to related descriptions in the foregoing embodiment, and details are not described herein again. The first network device may send the fifth message to the second network device. Optionally, the fifth message may include the information used to indicate that the terminal initiates the RNAU. Optionally, the fifth message may be, for example, a context request message. In a possible implementation, after receiving the message including the information used to indicate that the terminal initiates the RNAU from the terminal, the first network device may send the fifth message to the second network device.

In some embodiments, the fifth message may not include the information used to indicate that the terminal initiates the RNAU. The fifth message is a notification message, and the fifth message may indicate that the terminal initiates the RNAU. The fifth message is, for example, a new message.

S503: The second network device sends a sixth message to the first network device based on the fifth message.

In this embodiment, after receiving the fifth message from the first network device, if determining to configure the terminal to be in an idle state, the second network device sends the sixth message to the first network device. The sixth message includes information used to indicate the terminal to enter the idle state. Optionally, the sixth message may be, for example, a context response message.

For example, a manner in which the second network device determines to configure the terminal to be in the idle state is described below.

In some embodiments, the second network device may perform timing for duration for the terminal is in the inactive state. When determining that total duration for the terminal is in the inactive state is greater than or equal to preset duration, the second network device may determine to configure the terminal to be in the idle state.

In some embodiments, the second network device may record a quantity of times for which the terminal has initiated the RNAU after entering the inactive state. The second network device updates, based on the fifth message received from the first network device, the quantity of times for which the terminal has initiated the RNAU after entering the inactive state, for example, increases the recorded quantity of times for which the terminal has initiated the RNAU after entering the inactive state by 1. Then, when an updated quantity of times is greater than or equal to a preset quantity of times, the second network device determines to configure the terminal to be in the idle state. It should be noted that the second network device may also receive a message that is sent by a network device other than the first network device and that includes information used to indicate that the terminal initiates the RNAU. Each time the second network device receives such a message, a quantity of times for which the RNAU is initiated is also increased by 1.

S504: The first network device configures, according to the sixth message, the terminal to enter the idle state.

S505: The terminal enters the idle state.

In this embodiment, after receiving the sixth message from the second network device, the first network device configures, according to the sixth message, the terminal to enter the idle state, and then the terminal enters the idle state.

In some embodiments, a manner in which the first network device configures, according to the sixth message, the terminal to enter the idle state may be: The first network device transparently transmits the sixth message to the terminal, and the terminal enters the idle state according to the sixth message; or, the first network device sends a new message such as a seventh message to the terminal based on the sixth message, and indicates, by using the seventh message, the terminal to enter the idle state.

It may be understood that the terminal or the network device (the second network device or the first network device) may perform some or all of the steps in the foregoing embodiment. These steps or operations are merely examples. In the embodiments of this application, another operation or variations of various operations may further be performed. In addition, the steps may be performed in a sequence different from that presented in the foregoing embodiment, and possibly, not all operations in the foregoing embodiment need to be performed.

In this embodiment, the second network device receives the fifth message from the first network device, learns, based on the fifth message, that the terminal initiates the periodic RNAU, and then sends, to the first network device, the sixth message used to indicate the terminal to enter the idle state; then, the first network device configures, according to the sixth message, the terminal to enter the idle state. Therefore, even if the second network device does not receive the resume request message that is sent by the terminal and used to indicate the periodic RNAU, the second network device may still perform a release operation, so that the terminal enters the idle state, preventing the terminal from staying in the inactive state for a long period of time, and reducing unnecessary air interface signaling overheads and energy consumption of the terminal.

Figure 6:
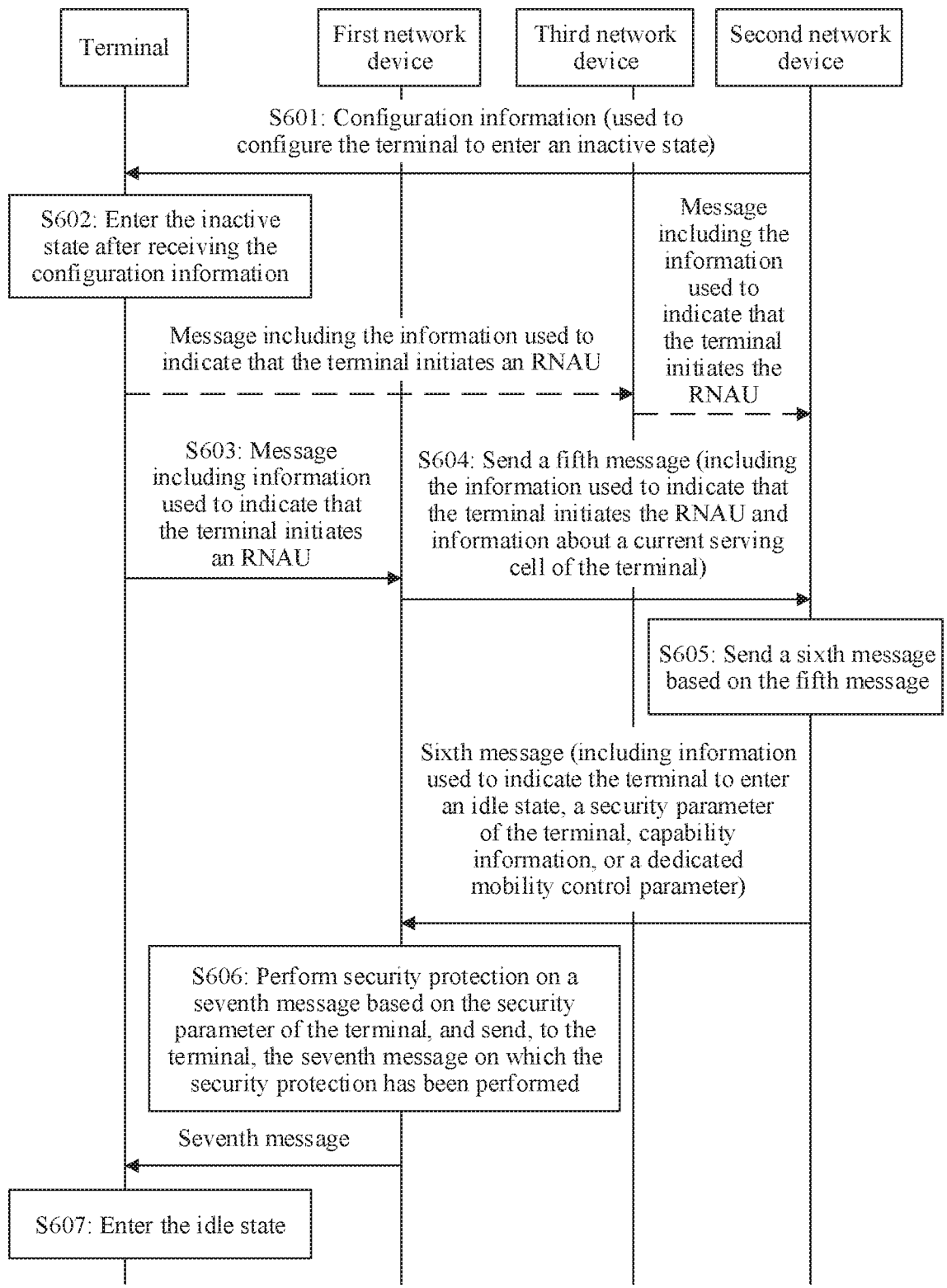
FIG. 6 is a flowchart of a communication method according to another embodiment of this application.

FIG. 6 is a flowchart of a communication method according to another embodiment of this application. As shown in FIG. 6, the method in this embodiment is described by using an example in which a first network device sends a seventh message to a terminal based on a sixth message. The method in this embodiment may include the following steps.

S601: A second network device sends configuration information to the terminal.

S602: After receiving the configuration information, the terminal enters an inactive state.

In this embodiment, for S601 and S602, refer to related descriptions in the foregoing embodiment, and details are not described herein again.

S603: The terminal sends, to the first network device, a message including information used to indicate that the terminal initiates an RNAU.

In this embodiment, each time a timer of the RNAU expires, the terminal sends, to a network device (for example, the first network device) to which a current serving cell belongs, the message including the information used to indicate that the terminal initiates the RNAU. It should be noted that, before the terminal sends, to the first network device in this embodiment, the message including the information used to indicate that the terminal initiates the RNAU, if the serving cell of the terminal belongs to another network device (for example, a third network device) other than the first network device, the terminal sends, to the another network device, the message including the information used to indicate that the terminal initiates the RNAU.

S604: The first network device sends a fifth message to the second network device.

In this embodiment, the first network device sends the fifth message to the second network device. Optionally, the fifth message includes the information used to indicate that the terminal initiates the RNAU.

S605: The second network device sends a sixth message to the first network device based on the fifth message.

In this embodiment, the second network device determines, based on the fifth message, that the terminal initiates a periodic RNAU, and then updates a quantity of times for which the terminal has initiated the periodic RNAU when in the inactive state. When an updated quantity of times is greater than or equal to a preset quantity of times, the second network device determines to configure the terminal to be in an idle state, and then sends the sixth message to the first network device. The sixth message includes information used to indicate, to the first network device, that the terminal is indicated to enter the idle state.

In some embodiments, the second network device may send the sixth message to the first network device when total duration that is recorded by the second network device and for which the terminal is in the inactive state is greater than or equal to preset duration.

S606: The first network device performs security protection on the seventh message based on a security parameter of the terminal, and sends, to the terminal, the seventh message on which the security protection has been performed.

In this embodiment, after receiving the sixth message from the second network device, the first network device determines, based on the sixth message, that the first network device needs to indicate the terminal to enter the idle state, and then determines to generate the seventh message. The seventh message includes information used to indicate the terminal to enter the idle state. The seventh message generated by the first network device is a message on which the security protection has been performed. Optionally, the seventh message is, for example, a context release message.

In this embodiment, the first network device may further receive the security parameter of the terminal from the second network device. Optionally, the security parameter of the terminal may be included in the sixth message, or may not be included in the sixth message. In other words, the security parameter of the terminal may alternatively be sent by using another message. This is not limited in the embodiments of this application.

In some embodiments, the security parameter includes a security algorithm and a key derived based on information about the current serving cell of the terminal, and the first network device performs security protection on the seventh message based on the security algorithm and the key derived based on the information about the current serving cell of the terminal. In some embodiments, the security algorithm includes an integrity protection algorithm, and the first network device performs integrity protection on the seventh message based on the integrity protection algorithm and the key derived based on the information about the current serving cell of the terminal. In some embodiments, the security algorithm includes an integrity protection algorithm and an encryption algorithm, and the first network device performs integrity protection and encryption on the seventh message based on the integrity protection algorithm, the encryption algorithm, and the key derived based on the information about the current serving cell of the terminal.

In some embodiments, the security parameter includes a security algorithm, a next hop key, and/or a next hop key chaining count. Optionally, the next hop key may be an NH (Next Hop), and the next hop key chaining count may be a next hop chaining count (NCC). The first network device performs security protection on the seventh message based on the next hop key chaining count and the security algorithm. In some embodiments, the security algorithm includes an integrity protection algorithm. The first network device performs integrity protection on the seventh message based on the integrity protection algorithm, the next hop key chaining count, and/or the next hop key. In some embodiments, the security algorithm includes an integrity protection algorithm and an encryption algorithm. The first network device performs integrity protection and encryption on the seventh message based on the integrity protection algorithm, the encryption algorithm, the next hop key count, and/or the next hop key.

In some embodiments, the first network device may further send the information about the current serving cell of the terminal to the second network device, where the information about the serving cell includes at least one of a physical cell identifier, an absolute radio frequency channel number, or a global cell identifier that are of the serving cell. Optionally, the information about the current serving cell of the terminal may be included in the fifth message, or may not be included in the fifth message. In other words, the information about the current serving cell of the terminal may alternatively be sent by using another message. This is not limited in the embodiments of this application. Correspondingly, the second network device may derive the key based on the information about the current serving cell of the terminal, and perform security protection on a message related to the terminal by using the derived key.

In some embodiments, the second network device may further send a dedicated mobility control parameter of the terminal to the first network device. The dedicated mobility control parameter is used to indicate a configuration parameter required by the terminal to perform cell reselection. The dedicated mobility control parameter may include at least one of priority information of the cell and/or absolute radio frequency channel number, a redistribution factor of the cell and/or absolute radio frequency channel number, and redirection information of the cell and/or absolute radio frequency channel number. Optionally, the dedicated mobility control parameter may further include valid time information, used to indicate a valid time of the dedicated mobility control parameter. Optionally, the dedicated mobility control parameter of the terminal may be included in the sixth message, or may not be included in the sixth message. In other words, the dedicated mobility control parameter may alternatively be sent by using another message. This is not limited in the embodiments of this application.

In some embodiments, the first network device may further send the dedicated mobility control parameter of the terminal to the terminal. Optionally, the dedicated mobility control parameter of the terminal may be included in the seventh message, or may not be included in the seventh message. In other words, the dedicated mobility control parameter may alternatively be sent by using another message. This is not limited in the embodiments of this application.

In some embodiments, the second network device further sends capability information of the terminal to the first network device. The capability information may be, for example, capability information of a supported radio access standard/absolute radio frequency channel number. Correspondingly, the first network device further configures a dedicated mobility control parameter of the terminal based on the capability information of the terminal in the sixth message, and then sends the dedicated mobility control parameter of the terminal to the terminal. Optionally, the capability information of the terminal may be included in the sixth message, or may not be included in the sixth message. In other words, the capability information of the terminal may alternatively be sent by using another message. This is not limited in the embodiments of this application. Optionally, the dedicated mobility control parameter of the terminal may be included in the seventh message, or may not be included in the seventh message. In other words, the dedicated mobility control parameter may alternatively be sent by using another message. This is not limited in the embodiments of this application.

The dedicated mobility control parameter of the terminal is used to control a reselection behavior of the terminal. The dedicated control parameter may include at least one of information such as a frequency/cell reselection priority, a frequency/cell reselection sub-priority, a reselection frequency, and a frequency/cell reselection redistribution factor.

S607: The terminal enters the idle state.

In this embodiment, the terminal receives the seventh message from the first network device, and releases context information of the terminal based on the seventh message, to enter the idle state.

Optionally, if the terminal further receives the dedicated mobility control parameter of the terminal, the terminal may perform cell reselection based on the dedicated mobility control parameter of the terminal.

Optionally, after sending the sixth message to the first network device, the second network device may further send a first request message to a core network device. The first request message is used to request the core network device to release the context information of the terminal, and the first request message is, for example, a context release request message. After releasing the context information of the terminal, the core network device sends a first response message to the second network device. The first response message is used to acknowledge release of the context information of the terminal, and the first response message is, for example, a context release response message.

After receiving the sixth message, the first network device may further release context information (for example, the security parameter of the terminal, the dedicated mobility control parameter of the terminal, and the capability information of the radio access standard/absolute radio frequency channel number supported by the terminal) of the terminal that is received from the second network device. After determining to configure the terminal to be in the idle state, the second network device may further release the context information of the terminal.

In some embodiments, the fifth message may be a context request message, and the sixth message may be a context response message.

It may be understood that the terminal or the network device (the second network device or the first network device) may perform some or all of the steps in the foregoing embodiment. These steps or operations are merely examples. In the embodiments of this application, another operation or variations of various operations may further be performed. In addition, the steps may be performed in a sequence different from that presented in the foregoing embodiment, and possibly, not all operations in the foregoing embodiment need to be performed.

In this embodiment, after receiving a resume request message that is sent by the terminal and used to indicate the periodic RNAU, the first network device sends the fifth message to the second network device, to indicate that the terminal initiates the periodic RNAU; the second network device sends the sixth message to the first network device based on the fifth message, to indicate, to the first network device, that the terminal is indicated to enter the idle state; and then the first network device sends the seventh message to the terminal based on the sixth message, to indicate the terminal to enter the idle state. Therefore, even if the terminal initiates the periodic RNAU when not in a coverage area of the second network device, the first network device may still perform a release operation in a timely manner, so that the terminal enters the idle state, preventing the terminal from staying in the inactive state for a long period of time, and reducing unnecessary air interface signaling overheads and energy consumption of the terminal.

Figure 7:
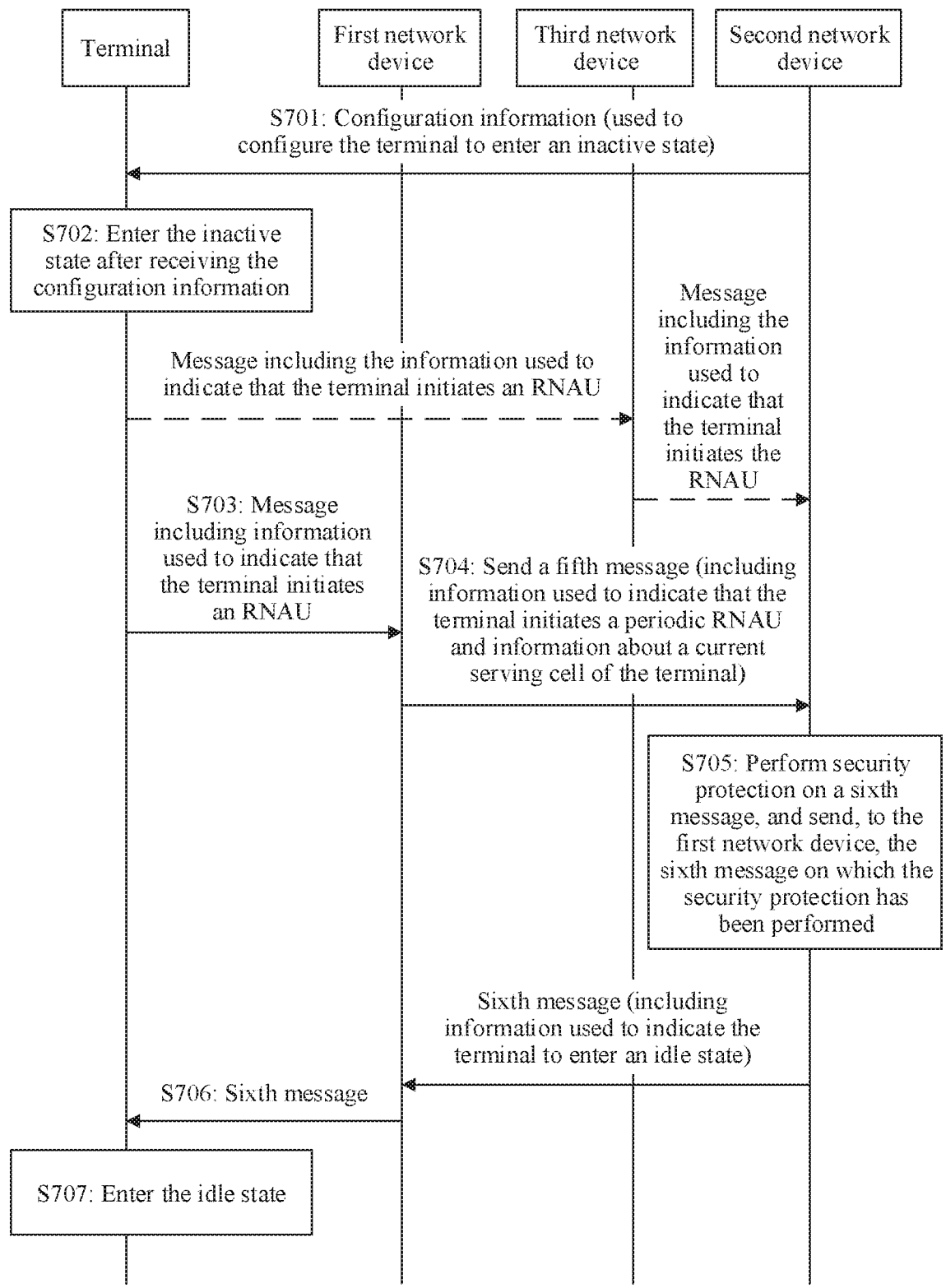
FIG. 7 is a flowchart of a communication method according to another embodiment of this application.

FIG. 7 is a flowchart of a communication method according to another embodiment of this application. As shown in FIG. 7, the method in this embodiment is described by using an example in which a first network device transparently transmits, to a terminal, a sixth message sent by a second network device. The method in this embodiment may include the following steps.

S701: The second network device sends configuration information to the terminal.

S702: After receiving the configuration information, the terminal enters an inactive state.

S703: The terminal sends, to the first network device, a message including information used to indicate that the terminal initiates an RNAU.

S704: The first network device sends a fifth message to the second network device.

In this embodiment, for a specific implementation process of S701 to S704, refer to related descriptions in the embodiment shown in FIG. 6, and details are not described herein again.

S705: The second network device performs security protection on the sixth message, and sends, to the first network device, the sixth message on which the security protection has been performed.

In this embodiment, the second network device determines, based on the fifth message, that the terminal initiates a periodic RNAU, and then updates a quantity of times for which the terminal has initiated the periodic RNAU when in the inactive state. When an updated quantity of times is greater than or equal to a preset quantity of times, the second network device determines to configure the terminal to be in an idle state, and then determines to generate the sixth message. The sixth message includes information used to indicate the terminal to enter the idle state.

In some embodiments, when total duration that is recorded by the second network device and for which the terminal is in the inactive state is greater than or equal to preset duration, the second network device determines to configure the terminal to be in the idle state, and generates the sixth message.

The sixth message generated by the second network device is a message on which the security protection has been performed.

In some embodiments, the security protection includes integrity protection. In some embodiments, the security protection includes integrity protection and encryption.

A key used for the security protection includes at least one of the following: a stored old key, a first new key, or a second new key.

The old key is a key used when configuring the terminal to enter the inactive state, the first new key is a key derived by the second network device based on the old key and information about a current serving cell of the terminal, and the second new key includes a next hop key and/or a next hop key chaining count. Optionally, the next hop key may be an NH (Next Hop), and the next hop key chaining count may be an NCC (NCC).

In some embodiments, the second network device may further send the information about the current serving cell of the terminal to the first network device, where the information about the serving cell includes at least one of a physical cell identifier, an absolute radio frequency channel number, or a global cell identifier that are of the serving cell. Optionally, the information about the current serving cell of the terminal may be included in the fifth message, or may not be included in the fifth message. In other words, the information about the current serving cell of the terminal may alternatively be sent by using another message. This is not limited in the embodiments of this application.

In some embodiments, the second network device may further perform the security protection on the sixth message based on a packet data convergence protocol sequence number (PDCP SN). For example, the second network device may perform the security protection on the sixth message based on the PDCP SN and a key used for the security protection.

In some embodiments, the PDCP SN may be sent by the first network device to the second network device. For example, the PDCP SN is carried in the fifth message sent by the first network device to the second network device.

In some embodiments, the PDCP SN may be equal to a preset sequence number. For example, the PDCP SN is equal to 0.

In some embodiments, the PDCP SN may be equal to a PDCP SN stored in the terminal or the second network device. If the PDCP SN is equal to the PDCP SN stored in the terminal, the terminal may send a resume request message including the PDCP SN to the first network device, and the first network device sends the resume request message to the second network device. Alternatively, each time the terminal receives a message carried on a signaling radio bearer (SRB) 1, the terminal automatically increases the PDCP SN stored in the terminal by 1. Correspondingly, the PDCP SN stored in the second network device is also automatically increased by 1. Specifically, the second network device automatically increases the PDCP SN by 1 based on the message carried on the SRB 1 and sent by the second network device to the terminal. Alternatively, the second network device increases the stored PDCP SN by 1 according to an indication of the first network device. For example, after sending a message carried on the SRB 1 to the terminal, the first network device indicates the second network device to increase the stored PDCP SN by 1.

In some embodiments, the fifth message may be, for example, a context request message.

S706: The first network device sends the sixth message to the terminal.

In this embodiment, the first network device receives the sixth message sent by the second network device. The sixth message is the sixth message on which the second network device has performed the security protection. The first network device sends only the sixth message to the terminal. Optionally, the first network device may further receive indication information sent by the second network device. The indication information is used to indicate the first network device to send the sixth message.

In some embodiments, the sixth message is, for example, a radio resource control (RRC) release message.

S707: The terminal enters the idle state.

In this embodiment, the terminal receives the sixth message from the first network device, and releases context information of the terminal according to the sixth message to enter the idle state. For example, the terminal performs security protection (for example, decryption and/or de-integrity protection) on the sixth message based on a security parameter received from the second network device, obtains the information in the sixth message, then determines, based on the information in the sixth message, that the second network device indicates the terminal to enter the idle state, and subsequently enters the idle state.

It should be noted that the terminal receives the sixth message from the first network device, but the sixth message is sent by the second network device.

Optionally, after sending the sixth message to the first network device, the second network device may further send a first request message to a core network device. The first request message is used to request the core network device to release the context information of the terminal, and the first request message is, for example, a context release request message. After releasing the context information of the terminal, the core network device sends a first response message to the second network device. The first response message is used to acknowledge release of the context information of the terminal, and the first response message is, for example, a context release response message. After determining to configure the terminal to be in the idle state, the second network device may further release the context information of the terminal.

It may be understood that the terminal or the network device (the second network device or the first network device) may perform some or all of the steps in the foregoing embodiment. These steps or operations are merely examples. In the embodiments of this application, another operation or variations of various operations may further be performed. In addition, the steps may be performed in a sequence different from that presented in the foregoing embodiment, and possibly, not all operations in the foregoing embodiment need to be performed.

In this embodiment, after receiving a resume request message that is sent by the terminal and used to indicate the periodic RNAU, the first network device sends the fifth message to the second network device, to indicate that the terminal initiates the periodic RNAU; the second network device sends the sixth message to the first network device based on the fifth message, to indicate the terminal to enter the idle state; and the first network device forwards the sixth message to the terminal, to indicate the terminal to enter the idle state. Therefore, even if the second network device does not receive the periodic RNAU sent by the terminal, the second network device may still perform a release operation, so that the terminal enters the idle state, preventing the terminal from staying in the inactive state for a long period of time, and reducing unnecessary air interface signaling overheads and energy consumption of the terminal. In addition, the second network device may indicate, through transparent transmission of the first network device, the terminal to enter the idle state.

Compared with the embodiment shown in FIG. 7, in the embodiment shown in FIG. 6, the message that is received by the terminal and that indicates the terminal to enter the idle state is generated by the first network device. Therefore, the first network device and the second network device exchange less information. In the embodiment shown in FIG. 7, the message that is received by the terminal and that indicates the terminal to enter the idle state is generated by the second network device, and a main function of the first network device is forwarding. Therefore, a processing process of the first network device includes fewer steps.

In an embodiment, the terminal determines, based on whether the security protection has been performed on the received message (for example, determines whether the integrity protection has been performed on the received message, or whether the integrity protection and the encryption have been performed on the received message), whether to update a key when initiating the resume request message next time. The key may be used to generate short message authentication code-integrity (short MAC-I). If the message sent by the network device (the second network device or the first network device) and received by the terminal is carried by the signaling radio bearer (SRB) 1, the terminal and the network device (the second network device or the first network device) update the key, for example, change the key from a current key K1 to a next hop key K2. K2 may be obtained based on K1, or obtained based on information on the SRB 1. If the message sent by the network device (the second network device or the first network device) and received by the terminal is not carried on the SRB 1, the terminal and the network device (the second network device or the first network device) do not update the key. It may be understood that K1 herein may be a key used when the terminal enters the inactive state, or may be a key derived by the terminal based on a key used when the terminal enters the inactive state. This is not limited herein, and only how to update the key is described.

In addition, after the terminal enters the inactive state, when the terminal sends, for the first time, the message (for example, the resume request message) including the information used to indicate that the terminal initiates the RNAU, for whether to generate the short MAC-I by using a new key (where a default key used when the terminal enters the inactive state is, for example, K0, the new key is, for example, K1, and K1 is different from K0), the following principle may alternatively be considered: If the resume request message includes the information indicating the periodic RNAU, the terminal and the network device do not update the key. Therefore, according to the foregoing solution, the key does not need to be updated each time the terminal initiates uplink access, avoiding wastes of keys.

It may be understood that, when the network device has a CU-DU architecture, the security parameter may be stored in a CU.

A manner in which the network device sends the security parameter of the terminal stored in the CU to another network device or the terminal may be any one of the following manners but is not limited to the following manners.

For example, the security parameter may be included in RRC signaling. To be specific, the CU may encapsulate the security parameter into the RRC signaling and send the RRC signaling to the terminal.

Alternatively, for another example, the security parameter may be included in an RLC header or a MAC header. Optionally, the CU may send the security parameter to a DU. Then, the DU encapsulates the received security parameter into the RLC header or the MAC header, and sends the RLC header or the MAC header to the terminal.

When the network device sends the security parameter to the terminal in either of the two manners, the network device may further perform security protection on a sent message (signaling or data) based on the security parameter. The security protection includes integrity protection and/or encryption. The security parameter may include at least one of the security algorithm or the key. Optionally, the security algorithm includes at least one of the integrity protection algorithm and the encryption algorithm. The key may include at least one of the key derived from the information about the current serving cell of the terminal, the next hop key, and the next hop key chaining count. Therefore, the terminal may perform decryption and/or de-integrity on a received message (signaling or data) based on the received security parameter, to correctly obtain the signaling or data.

In some embodiments, when a CP includes a CU-CP and a CU-UP, the security parameter may be stored in the CU-CP, and the CU-CP may further send the security parameter to the CU-UP. The CU-UP performs security protection on user plane data based on the received security parameter. The CU-CP or the CU-UP may further send the security parameter to the DU, and then the DU encapsulates the received security parameter into an RLC header or a MAC header.

In some embodiments, the network device herein may be the first network device or the second network device. It may be understood that the manner of sending the security parameter herein may be applicable to the foregoing embodiments, or may be independent of the methods described in the embodiments in FIG. 2 to FIG. 7, and applicable to another scenario.

It may be understood that, in the foregoing embodiments, steps or operations implemented by the terminal may alternatively be implemented by a component (for example, a chip or a circuit) of be used in the terminal; steps or operations implemented by the first network device may alternatively be implemented by a component (for example, a chip or a circuit) of be used in the first network device; steps or operations implemented by the second network device may alternatively be implemented by a component (for example, a chip or a circuit) of be used in the second network device. This is not limited in the embodiments of this application.

Figure 8:
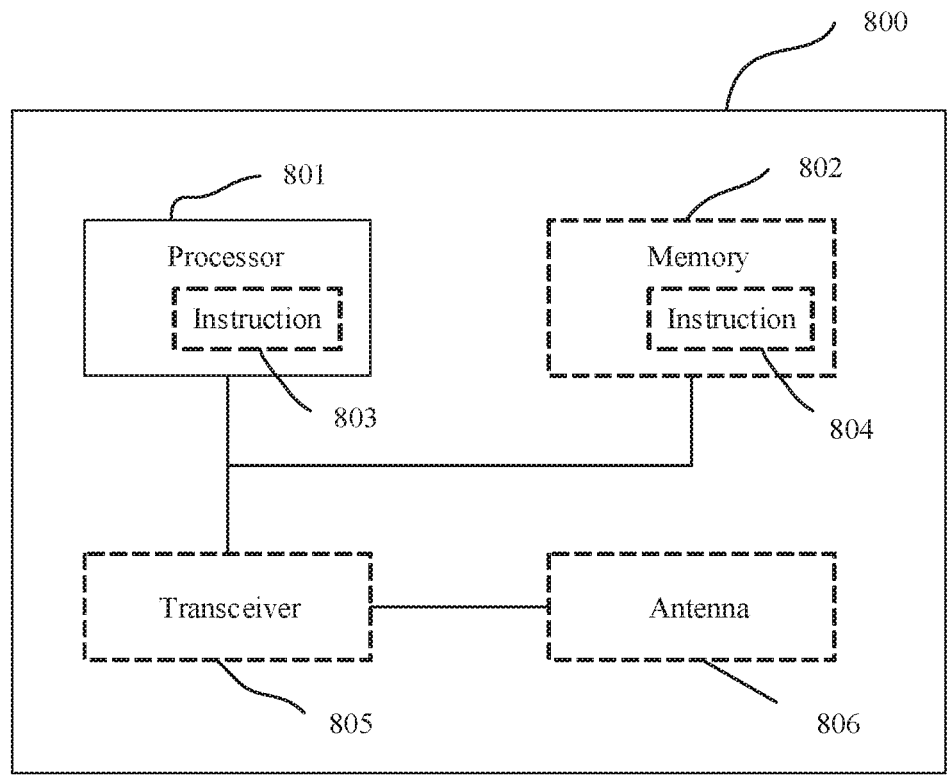
FIG. 8 is a schematic structural diagram of a communications apparatus according to an embodiment of this application.

FIG. 8 is a schematic structural diagram of a communications apparatus according to an embodiment of this application. As shown in FIG. 8, the communications apparatus 800 in this embodiment may be the first network device, the second network device, or the terminal in the foregoing method embodiments, or may be the core network device in the foregoing method embodiments. The communications apparatus may be configured to implement the method that is described in the foregoing method embodiments and that corresponds to the first network device, the second network device, the terminal, or the core network device. For details, refer to descriptions in the foregoing method embodiments.

The communications apparatus 800 may include one or more processors 801. The processor 801 may also be referred to as a processing unit, and may implement a specific control or processing function. The processor 801 may be a general-purpose processor, a dedicated processor, or the like. For example, the processor 801 may be a baseband processor or a central processing unit. The baseband processor may be configured to process a communication protocol and communications data. The central processing unit may be configured to: control a communications apparatus (for example, a base station, a baseband chip, a DU, or a CU), execute a software program, and process data of the software program.

In an optional design, the processor 801 may also store an instruction 803 or data (for example, intermediate data). The instruction 803 may be run by the processor, so that the communications apparatus 800 is enabled to perform the method that is described in the foregoing method embodiments and that corresponds to the first network device, the second network device, the terminal, or the core network device.

In another possible design, the communications apparatus 800 may include a circuit. The circuit may implement the sending, receiving, or communication function in the foregoing method embodiments.

Optionally, the communications apparatus 800 may include one or more memories 802. The memory stores an instruction 804. The instruction may be run on the processor, so that the communications apparatus 800 is enabled to perform the methods described in the foregoing embodiments.

Optionally, the memory may also store data. The processor and the memory may be disposed separately, or may be integrated together.

Optionally, the communications apparatus 800 may further include a transceiver 805 and an antenna 806. The processor 801 may be referred to as a processing unit, and controls the communications apparatus (the terminal, the first network device, the second network device, or the core network device). The transceiver 805 may be referred to as a transceiver unit, a transceiver machine, a transceiver circuit, a transceiver, or the like, and is configured to implement a transceiver function of the communications apparatus.

In a design, if the communications apparatus 800 is configured to implement the operations corresponding to the first network device in the foregoing embodiments, the first network device is a network device to which a current serving cell of a terminal belongs. For example, the transceiver 805 may receive a first message, and send a second message to the terminal. The second message is determined by the processor 80*i* based on the first message, and is used to indicate the terminal to enter an idle state. Alternatively, for example, the transceiver 805 may send a fifth message to a second network device after receiving, from the terminal, a message including information used to indicate that the terminal initiates a radio access network notification area update; the transceiver 805 receives a sixth message from the second network device; the transceiver 805 configures, according to the sixth message, the terminal to enter an idle state.

In another design, if the communications apparatus is configured to implement the operations corresponding to the second network device in the foregoing embodiments, the second network device is a network device that configures the terminal to enter an inactive state. For example, the transceiver 805 may send a first message to the first network device. Alternatively, for example, the transceiver 805 may receive a fifth message from a first network device, and the transceiver 805 sends a sixth message to the first network device. The sixth message may be determined by the processor 80*i* based on the fifth message.

In another design, if the communications apparatus is configured to implement the operations corresponding to the terminal, for example, the operations may include: The transceiver 805 sends a first message to a first network device, and receives a second message from the first network device; the processor 801 enters an idle state according to the second message.

For specific implementation processes of the transceiver 805 and the processor 80*i*, refer to related descriptions in the foregoing embodiments, and details are not described herein again.

The processor 801 and the transceiver 805 described in this application may be implemented on an integrated circuit (IC), an analog IC, a radio frequency integrated circuit (RFIC), a mixed signal IC, an application-specific integrated circuit (ASIC), a printed circuit board (PCB), an electronic device, or the like. The processor and the transceiver may also be manufactured by using various 1C technologies, for example, a complementary metal oxide semiconductor (CMOS), an N-type metal-oxide-semiconductor (NMOS), a P-type metal-oxide-semiconductor (PMOS), a bipolar junction transistor (BJT), a bipolar CMOS (BiCMOS), silicon germanium (SiGe), and gallium arsenide (GaAs).

In the foregoing embodiment descriptions, the communications apparatus 800 is described by using the first network device, the second network device, or the terminal as an example, but the communications apparatus described in this application is not limited to the network device or the terminal, and a structure of the communications apparatus may not be limited by FIG. 8. The communications apparatus 800 may be an independent device or may be a part of a relatively large device. For example, the device may be:

(1) an independent integrated circuit (IC), a chip, or a chip system or subsystem;

(2) a set including one or more ICs, where optionally, the IC set may further include a storage component configured to store data and/or an instruction;

(3) an ASIC, for example, a modem (MSM);

(4) a module that can be embedded in another device;

(5) a receiver, a terminal, a cellular phone, a wireless device, a hand-held phone, a mobile unit, a network device, or the like; or (6) another device or the like.

Figure 9:
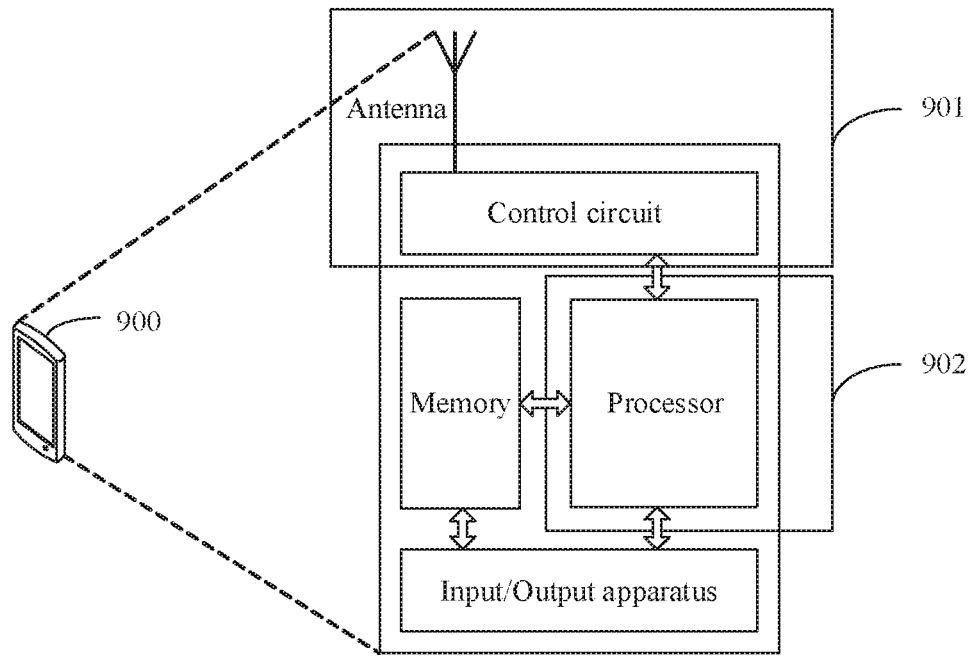
FIG. 9 is a schematic structural diagram of a terminal according to an embodiment of this application.

FIG. 9 is a schematic structural diagram of a terminal according to an embodiment of this application. The terminal may be applicable to the terminals in the foregoing embodiments of this application. For ease of description, FIG. 9 shows only main components of the terminal. As shown in FIG. 9, the terminal 900 includes a processor, a memory, a control circuit, an antenna, and an input/output apparatus. The processor is mainly configured to: process a communication protocol and communication data, control the entire terminal, execute a software program, and process data of the software program. The memory is mainly configured to store a software program and data. A radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user.

After the terminal is powered on, the processor can read a software program in a storage unit, interpret and execute an instruction of the software program, and process data of the software program. When data needs to be sent wirelessly, the processor performs baseband processing on the to-be-sent data, and then outputs a baseband signal to the radio frequency circuit. The radio frequency circuit performs radio frequency processing on the baseband signal, and then sends, by using the antenna, a radio frequency signal in an electromagnetic wave form. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 9 shows only one memory and only one processor. An actual terminal may include a plurality of processors and a plurality of memories. The memory may also be referred to as a storage medium, a storage device, or the like. This is not limited in the embodiments of the present invention.

In an optional implementation, the processor may include a baseband processor and a central processing unit. The baseband processor is mainly configured to process a communication protocol and communication data, and the central processing unit is mainly configured to: control the entire terminal, execute a software program, and process data of the software program. Functions of the baseband processor and the central processing unit are integrated into the processor in FIG. 9. A person skilled in the art may understand that the baseband processor and the central processing unit each may be an independent processor, and are interconnected by using technologies such as a bus. A person skilled in the art may understand that the terminal may include a plurality of baseband processors to adapt to different network standards, and the terminal may include a plurality of central processing units to enhance a processing capability of the terminal. All components of the terminal may be connected by using various buses. The baseband processor may also be expressed as a baseband processing circuit or a baseband processing chip. The central processing unit may also be expressed as a central processing circuit or a central processing chip. A function of processing the communication protocol and communication data may be embedded into the processor, or may be stored in the storage unit in a form of a software program, so that the processor executes the software program to implement a baseband processing function.

In an example, the antenna and the control circuit that have the transceiver function may be considered as a transceiver module 901 of the terminal 900, and the processor having the processing function may be considered as a processing module 902 of the terminal 900. As shown in FIG. 9, the terminal device 900 includes the transceiver module 901 and the processing module 902. The transceiver module may also be referred to as a transceiver, a transceiver machine, a transceiver apparatus, or the like. Optionally, a part that is configured to implement a receiving function and in the transceiver module 901 may be considered as a receiving module, and a part that is configured to implement a sending function and in the transceiver module 901 may be considered as a sending module. In other words, the transceiver module 901 includes the receiving module and the sending module. The receiving module may also be referred to as a receiver, a receiver circuit, or the like. The sending module may be referred to as a transmitter, a transmitter circuit, or the like.

Figure 10:
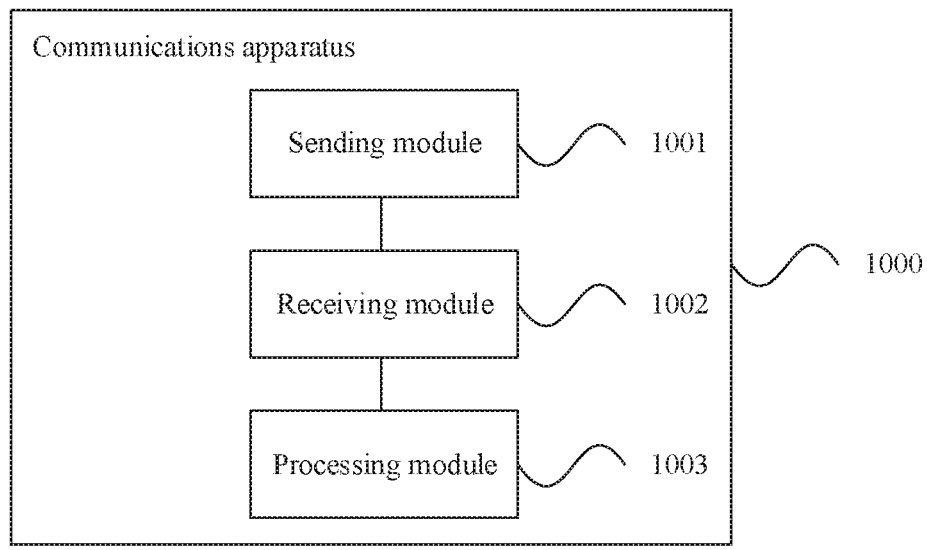
FIG. 10 is a schematic structural diagram of a communications apparatus according to another embodiment of this application.

FIG. 10 is a schematic structural diagram of a communications apparatus according to another embodiment of this application. The communications apparatus may be a terminal, or may be a component (for example, an integrated circuit or a chip) of a terminal, or may be another communications module, and is configured to implement the operations corresponding to the terminal in the method embodiments shown in FIG. 2 to FIG. 4. The communications apparatus may include a sending module 1001, a receiving module 1002, and a processing module 1003.

The sending module 1001 is configured to send a first message to the first network device.

The receiving module 1002 is configured to receive a second message from the first network device.

The processing module 1003 is configured to enter an idle state according to the second message.

Optionally, the radio access network notification area update is a periodic radio access network notification area update.

Optionally, the first message includes information indicating the radio access network notification area update.

In some embodiments, the receiving module 1002 is configured to: receive a sixth message from the first network device, and receive a security parameter from the second network device. The processing module 1003 is configured to: de-security-protection of the sixth message based on the security parameter received from the second network device, and enter the idle state according to the sixth message on which the security protection has been removed.

The terminal in this embodiment may be configured to implement the technical solutions of the terminal in the foregoing method embodiments. The implementation principles and technical effects are similar, and details are not described herein again.

Figure 11:
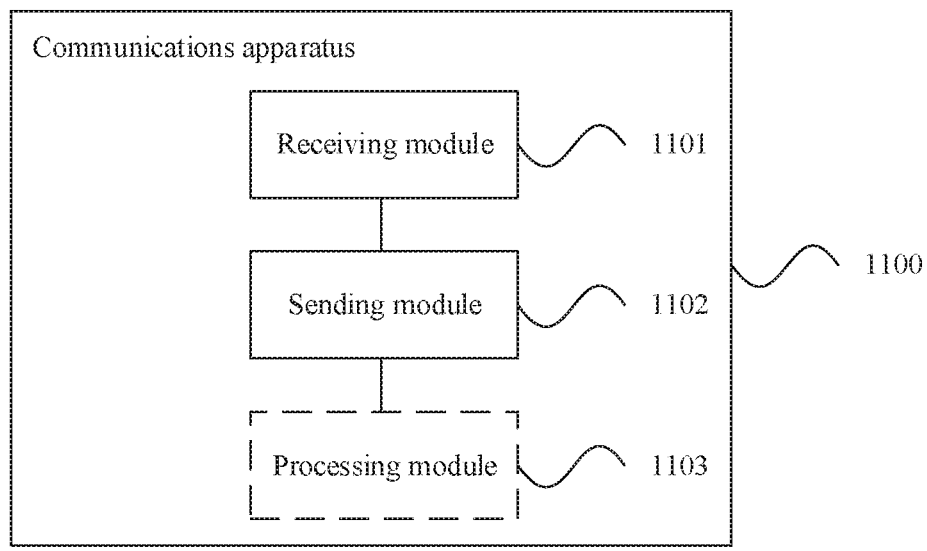
FIG. 11 is a schematic structural diagram of a communications apparatus according to another embodiment of this application.

FIG. 11 is a schematic structural diagram of a communications apparatus according to another embodiment of this application. The communications apparatus may be a network device, or may be a component (for example, an integrated circuit or a chip) of a network device, or may be another communications module, and is configured to implement the operations corresponding to the first network device or the second network device in the method embodiments shown in FIG. 2 to FIG. 7. The communications apparatus 1100 may include a receiving module 1101 and a sending module 1102. Optionally, the communications apparatus 1100 may further include a processing module 1103.

In a possible implementation, when the communications apparatus in this embodiment is configured to implement the operations corresponding to the first network device in the method embodiments shown in FIG. 2 to FIG. 4, the receiving module 1101 is configured to receive a first message.

The sending module 1102 is configured to send a second message to a terminal. The second message is determined by the processing module 1203 based on first information.

Optionally, the receiving module 1101 may be configured to: receive the first message from the terminal; or receive the first message from a second network device, where the second network device is a network device that configures the terminal to enter an inactive state.

Optionally, the sending module 1102 may further be configured to send a third message to a core network device.

Optionally, the sending module 1102 is configured to: when a quantity of times for which the terminal has initiated a radio access network notification area update after entering the inactive state is greater than or equal to a preset quantity of times, send the second message to the terminal; or when total duration for the terminal is in the inactive state is greater than or equal to preset duration, send the second message to the terminal.

Optionally, the radio access network notification area update is a periodic radio access network notification area update.

In a possible implementation, when the communications apparatus in this embodiment is configured to implement the operations corresponding to the second network device in the method embodiments shown in FIG. 2 to FIG. 4, the sending module 1102 is configured to send the first message to the first network device.

Optionally, a fourth message may be received from the first network device by using the receiving module 1101.

Optionally, a radio access network notification area update is a periodic radio access network notification area update.

Optionally, the fourth message is a context request message, and the first message is a context response message.

In a possible implementation, when the communications apparatus in this embodiment is configured to implement the operations corresponding to the first network device in the method embodiments shown in FIG. 5 to FIG. 7, the receiving module 1101 is configured to receive, from a terminal, a message including information used to indicate that the terminal initiates a radio access network notification area update.

The sending module 1102 is configured to: after the receiving module 1101 receives, from the terminal, the message including the information used to indicate that the terminal initiates the radio access network notification area update, send a fifth message to the second network device.

The receiving module 1101 is further configured to receive a sixth message from a second network device.

The sending module 1102 is further configured to configure, according to the sixth message, the terminal to enter an idle state.

The first network device is a network device to which a current serving cell of the terminal belongs, and the second network device is a network device that configures the terminal to enter the inactive state.

Optionally, the sending module 1102 is configured to send a seventh message to the terminal. The seventh message is determined by the processing module 1103 based on the sixth message.

Optionally, the receiving module 1101 is further configured to receive a security parameter of the terminal from the second network device, where the security parameter includes a security algorithm and a key derived based on information about the current serving cell of the terminal; or the security parameter includes a security algorithm and a next hop key chaining count, where the security algorithm includes an integrity protection algorithm, or the security algorithm includes an integrity protection algorithm and an encryption algorithm.

Optionally, the processing module 1103 is configured to perform security protection on the seventh message based on the security parameter.

The sending module 1102 is configured to send, to the terminal, the seventh message on which the security protection has been performed.

Optionally, the receiving module 1101 is further configured to receive a dedicated mobility control parameter of the terminal from the second network device.

Alternatively, the sixth message further includes capability information of the terminal, and the method further includes: The first network device obtains the dedicated mobility control parameter of the terminal based on the capability information of the terminal.

The seventh message further includes the dedicated mobility control parameter of the terminal.

Optionally, the sending module 1102 is configured to send the sixth message to the terminal.

Optionally, the fifth message further includes a PDCP SN, and the PDCP SN is used by the second network device to perform security protection.

Optionally, the sending module 1102 is further configured to send the information about the current serving cell of the terminal to the second network device.

In a possible implementation, when the communications apparatus in this embodiment is configured to implement the operations corresponding to the second network device in the method embodiments shown in FIG. 5 to FIG. 7, the receiving module 1101 is configured to receive a fifth message from a first network device.

The sending module 1102 is configured to send a sixth message to the first network device based on the fifth message. The first network device is a network device to which a current serving cell of a terminal belongs, and the second network device is a network device that configures the terminal to enter the inactive state.

Optionally, the sending module 1102 is further configured to send a security parameter of the terminal to the first network device. The security algorithm includes an integrity protection algorithm, or the security algorithm includes an integrity protection algorithm and an encryption algorithm.

Optionally, the sending module 1102 is further configured to send capability information of the terminal or a dedicated mobility control parameter of the terminal to the first network device.

Optionally, the processing module is configured to perform security protection on the sixth message.

The sending module 1102 is configured to send, to the first network device, the sixth message on which the security protection has been performed.

Optionally, a key used for the security protection includes at least one of the following: a stored old key, a first new key, or a second new key.

The old key is a key used when configuring the terminal to enter the inactive state, the first new key is a key derived by the second network device based on the old key and the information about the current serving cell of the terminal, and the second new key includes a next hop key chaining count.

Optionally, that the processing module 1103 performs the security protection includes: The processing module 1103 performs the security protection based on a PDCP SN.

The PDCP SN is carried in the fifth message, the PDCP SN is equal to a preset sequence number, or the PDCP SN is equal to a PDCP SN stored in the terminal.

Optionally, the receiving module 1101 is further configured to receive information about the current serving cell of the terminal from the first network device.

Optionally, the processing module 1103 is configured to update, based on the fifth message, a quantity of times that is recorded in the second network device and for which the terminal initiates a periodic radio access network notification area update.

The processing module is configured to: when an updated quantity of times is greater than or equal to a preset quantity of times, send the sixth message to the first network device.

The communications apparatus in this embodiment may be configured to perform the technical solutions of the first network device or the second network device in the foregoing method embodiments. The implementation principles and technical effects are similar, and details are not described herein again.

It should be noted that, in the embodiments of this application, division into the modules is an example, and is merely logical function division. During actual implementation, another division manner may be used. Function modules in the embodiments of this application may be integrated into one processing module, or each of the modules may exist alone physically, or two or more modules are integrated into one module. The integrated module may be implemented in a form of hardware, or may be implemented in a form of a software function module.

When the integrated module is implemented in a form of a software function module and sold or used as an independent product, the integrated module may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instruction is loaded and executed on a computer, the procedure or functions according to the embodiments of the present invention are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A communication method, comprising:
receiving, by a second network device from a first network device, information indicating that a terminal initiates a radio access network notification area update (RNAU) to the first network device, wherein the information indicating that the terminal initiates the RNAU is carried in a context request message, and the context request message comprises a physical cell identifier of a current serving cell of the terminal;
generating, by the second network device based on the information, a radio resource control release message on which security protection has been performed, the radio resource control release message indicating to configure the terminal to enter an idle state, wherein a key used for the security protection is derived by the second network device based on the physical cell identifier; and
sending, to the first network device, the radio resource control release message on which the security protection has been performed.

2. The method according to claim 1, wherein the radio resource control release message on which the security protection has been performed comprises information indicating to release context information of the terminal.

3. The method according to claim 1, wherein the security protection comprises integrity protection and encryption.

4. The method according to claim 3, wherein the security protection is performed using a key derived by the second network device based on an old key and the physical cell identifier, the old key being used to configure the terminal to enter an inactive state by the second network device.

5. A communication method, comprising:
sending, by a first network device to a second network device, information indicating that a terminal initiates a radio access network notification area update (RNAU) to the first network device, wherein the information indicating that the terminal initiates the RNAU is carried in a context request message, and the context request message comprises a physical cell identifier of a current serving cell of the terminal;
receiving, by the first network device from the second network device, a radio resource control release message on which security protection has been performed, the radio resource control release message indicating to configure the terminal to enter an idle state, wherein a key used for the security protection is derived based on the physical cell identifier; and
transmitting, by the first network device to the terminal, the radio resource control release message on which the security protection has been performed.

6. The method according to claim 5, wherein the radio resource control release message on which the security protection has been performed comprises information indicating to release context information of the terminal.

7. The method according to claim 5, wherein the security protection comprises integrity protection and encryption.

8. The method according to claim 7, wherein the security protection is performed using a key derived based on an old key and the physical cell identifier, the old key being used to configure the terminal to enter an inactive state by the second network device.

9. A communications system, comprising a first network device and a second network device, wherein:
the first network device is configured to send information indicating that a terminal initiates a radio access network notification area update (RNAU) to the first network device, receive, from the second network device, a radio resource control release message on which security protection has been performed at the second network device, the radio resource control release message indicating to configure the terminal to enter an idle state, and transmit the radio resource control release message on which the security protection has been performed to the terminal, wherein the information indicating that the terminal initiates the RNAU is carried in a context request message, the context request message comprises a physical cell identifier of a current serving cell of the terminal, and a key used for the security protection is derived based on the physical cell identifier, and
the second network device is configured to receive the information indicating that the terminal initiates the RNAU.

10. The communications system according to claim 9, wherein the radio resource control release message on which the security protection has been performed comprises information indicating to release context information of the terminal.

11. The communications system according to claim 9, wherein the security protection comprises integrity protection and encryption.

12. The communications system according to claim 11, wherein the security protection is performed using derived by the second network device based on an old key and the physical cell identifier, the old key being used to configure the terminal to enter an inactive state by the second network device.

* * * * *